(12) United States Patent
Kajiwara

(10) Patent No.: US 7,653,125 B2
(45) Date of Patent: Jan. 26, 2010

(54) TAP COEFFICIENT DETERMINING METHOD AND APPARATUS, AND DIGITAL SIGNAL PHASE LOCKING METHOD AND APPARATUS

(75) Inventor: Yoshiyuki Kajiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 589 days.

(21) Appl. No.: 11/505,947

(22) Filed: Aug. 18, 2006

(65) Prior Publication Data

US 2007/0041116 A1 Feb. 22, 2007

(30) Foreign Application Priority Data

Aug. 19, 2005 (JP) .............................. 2005-239034

(51) Int. Cl.
*H03K 5/159* (2006.01)
*H03H 7/30* (2006.01)
*H03H 7/40* (2006.01)

(52) U.S. Cl. ........................ 375/229; 375/231; 375/232; 375/233

(58) Field of Classification Search .................. 375/229, 375/231, 232, 233
See application file for complete search history.

(56) References Cited

U.S. PATENT DOCUMENTS

| 7,379,516 | B2 * | 5/2008 | Dati et al. ..................... 375/350 |
| 7,496,138 | B2 * | 2/2009 | Pietraski et al. ............. 375/232 |
| 2005/0219727 | A1 * | 10/2005 | Kajiwara et al. .............. 360/39 |

\* cited by examiner

*Primary Examiner*—Ted M Wang
(74) *Attorney, Agent, or Firm*—Oblon, Spivak, McClelland, Maier & Neustadt, L.L.P.

(57) ABSTRACT

A method determines tap coefficients of a phase interpolation finite impulse response (FIR) filter with respect to a digital-signal phase-locked loop processing apparatus including an A/D converter receiving a reproduced signal serving as digital data and sampling the received reproduced signal at a frequency higher than a data rate frequency and a PLL portion performing phase locking of the reproduced signal by filtering the sampled reproduced signal obtained by the A/D converter using the phase interpolation FIR filter and outputting a data sequence of the phase-locked reproduced signal. The method includes providing an adaptive equalization FIR filter at the data rate frequency at a stage subsequent to the PLL portion and determining the tap coefficients of the phase interpolation FIR filter using, as estimated values, FIR filter tap coefficients of the adaptive equalization FIR filter, which are converged so as to achieve a minimum mean square error.

6 Claims, 25 Drawing Sheets

LOW-PASS FILTER 16 TAPS (r=0.2)

RESULTS OF RESAMPLING CONVERGED TAP COEFFICIENTS B[i] · (7/8)

COMPARISON OF TAP COEFFICIENTS

TAP COEFFICIENT DETERMINING METHOD AND APPARATUS, AND DIGITAL SIGNAL PHASE LOCKING METHOD AND APPARATUS

CROSS REFERENCES TO RELATED APPLICATIONS

The present invention contains subject matter related to Japanese Patent Application JP 2005-239034 filed in the Japanese Patent Office on Aug. 19, 2005, the entire contents of which are incorporated herein by reference.

BACKGROUND OF THE INVENTION

1. Field of the Invention

The present invention relates to a method and apparatus for determining tap coefficients in phase locking in reproducing recorded or transmitted digital data and to a method and apparatus for performing phase locking in reproducing recorded or transmitted digital data.

2. Description of the Related Art

A storage device using magnetic or optical recording technology or the like has an analog signal processing block including an analog circuit and a digital signal processing block including a digital circuit, which are circuits for playing back a recorded signal.

Due to recent developments in semiconductor manufacturing technology, the size and the speed of a digital circuit portion in a large-scale integrated circuit (LSI) are increasing. In such a particularized semiconductor manufacturing process, an analog circuit portion has a large influence on the cost performance since the analog circuit portion occupies a large area on a chip, and there is a growing demand to reduce the scale of the analog circuit portion. A high-performance digital signal processor that previously could not be mounted onto a circuit due to the circuit scale and the cost can now actually be mounted. One such example is a digital phase-locked loop (PLL) circuit.

As an example of the configuration of a digital PLL circuit, a digital signal processing PLL circuit using an interpolated timing recovery (ITR) scheme (may also be referred to as an "ITR digital PLL circuit") has been widely put to practical use. Applications of such an ITR digital PLL circuit in the field of reproducing magnetically recorded data are described in articles entitled "A MMSE Interpolated Timing Recovery Scheme for the Magnetic Recording Channel", Zi-Ning Wu, John M. Cioffi, et al., Communications, 1997, ICC '97 Montreal, Towards the Knowledge Millennium, 1997 IEEE International Conference on, Vol. 3, 1997, pp. 1625-1629 Vol. 3, and "Interpolated Timing Recovery for Hard Disk Drive Read Channels", Mark Spurbeck and Richard T. Behrens, Communications, 1997, ICC '97 Montreal, Towards the Knowledge Millennium, 1997 IEEE International Conference on, Vol. 3, 1997, pp. 1618-1624 Vol. 3. The ITR scheme can also be easily applied to a reproducing architecture for playing magnetically or optically recorded signals.

FIG. 27 shows an example of the configuration of an optical disk player including an ITR digital PLL circuit.

An optical disk reproduced signal processor 101 includes, as shown in FIG. 27, an analog anti-aliasing filter 102, an analog-to-digital (A/D) converter 103 that performs analog-to-digital conversion, a digital equalization filter 104 that performs equalization, and an ITR digital PLL circuit 110.

The ITR digital PLL circuit 110 includes a phase interpolation filter 111 that interpolates the output of the digital equalization filter 104, a phase error calculator 112 that calculates a phase error between the input and the output of the phase interpolation filter 111, a digital loop filter 113 that filters an output signal of the phase error calculator 112, a phase integrator 114 that integrates an output signal of the digital loop filter 113, and an interpolation tap coefficient read-only memory (ROM) 115 that stores interpolation tap coefficients and that generates and outputs interpolation tap coefficients necessary according to an output value of the phase integrator 114 to the phase interpolation filter 111.

A reproduced signal r(k) is input from an optical disk to the optical disk reproduced signal processor 101.

The input reproduced signal r(k) is anti-aliased by the analog anti-aliasing filter 102, and thereafter is sampled by the A/D converter 103 at a frequency fs=α·fd (α>1.0), which is slightly higher than a data rate frequency fd. The sampled reproduced signal r(k) is input to the digital equalization filter 104 and equalized according to a desired equalization scheme, and thereafter, the equalized signal is input to the digital PLL circuit 110. The desired equalization scheme is a partial response (PR) equalization target or the like for use in general digital signal processing.

The digital PLL circuit 110 performs phase locking of the reproduced signal r(k) by shifting the phase by a desired amount and outputs an output signal y(k) synchronized in phase with the reproduced signal r(k). The ITR digital PLL circuit 110 decimates the signal, that is, obtains only a necessary signal and discards an unnecessary signal generated due to a difference between the data rate frequency fd and the sampling frequency fs by estimating a point at which a signal mismatching occurs, that is, a point at which there is a phase jump.

Various methods have been proposed to interpolate sampled data in the ITR digital PLL circuit 110. When phase interpolation is achieved using a finite impulse response (FIR) filter, a sinc function, a sinc function multiplied by various window functions for use in digital signal processing, or the like is generally used as interpolation tap coefficients of the FIR filter.

However, these interpolation tap coefficients implement a filter that basically has low-pass frequency characteristics and are not often used in, for example, active equalization for amplifying high frequency components of a signal. This is because, in order to design an interpolation filter with strictly determined frequency characteristics, it is necessary to fully understand the relationship between the data rate frequency fd and the sampling frequency fs.

In known optical disk players or the like, an equalizing circuit is provided, apart from the digital PLL circuit 110, to implement partial response equalization.

As an example of an equation to calculate a phase error for use in a partial-response-equalized data signal sequence, a timing gradient equation shown in the following equation (1) is described in "A PRML System for Digital Magnetic Recording", Roy D. Cideciyan, F. Dolivo, et al., IEEE Journal on Selected Areas in Communications, Vol. 10, No. 1, January 1992, pp. 38-56:

$$\Delta\tau(k) = -\hat{y}(k) \cdot y(k-1) + \hat{y}(k-1) \cdot y(k) \quad (1)$$

Δτ(k): calculated amount of phase error at time k
y(k): PLL output at time k
ŷ(k): ideal partial-response-equalized signal output estimated from y(k) at time k In the case of a system for calculating a phase error using equation (1), it is necessary that a PLL output signal be accurately equalized to a desired partial response signal. In order to achieve this accurate equalization, in the related art, as shown in FIG. 27, a digital equalization filter (FIR-type, infinite impulse response (IIR) type, or the like) has been provided at a stage subsequent to the A/D converter 103 and prior to the digital PLL circuit 110, or alternatively, as shown in FIG. 28, an analog equalization filter 105 has been provided at a stage prior to the A/D converter 103, thereby equalizing a signal to a partial response signal.

It is a difficult determining problem to achieve an optimal equalization performance using the analog equalization filter 105. When the digital equalization filter 104 is used equivalent architectures are present in both the digital equalization filter 104 and, at a subsequent stage, the phase interpolation filter 111 in the digital PLL circuit 110 for performing digital PLL processing. Thus, the circuit scale is increased.

SUMMARY OF THE INVENTION

It is desirable to provide a method and apparatus for determining tap coefficients of an interpolation filter that can improve the performance and reduce the circuit scale of an equalization filter in a signal processing system for a desired equalization target, such as a partial response equalization target, and to provide a method and apparatus for performing phase locking in reproducing recorded or transmitted digital data.

According to an embodiment of the present invention, there is provided a method for determining tap coefficients of a phase interpolation finite impulse response (FIR) filter with respect to a digital-signal phase-locked loop processing apparatus including an analog-to-digital (A/D) converter configured to receive a reproduced signal serving as digital data and to sample the received reproduced signal at a frequency higher than a data rate frequency and a phase-locked loop (PLL) portion configured to perform phase locking of the reproduced signal by filtering the sampled reproduced signal obtained by the A/D converter using the phase interpolation FIR filter and to output a data sequence of the phase-locked reproduced signal. The method includes the step of providing an adaptive equalization FIR filter operating at the data rate frequency at a stage subsequent to the PLL portion and determining the tap coefficients of the phase interpolation FIR filter using, as estimated values, FIR filter tap coefficients of the adaptive equalization FIR filter, which are converged so as to achieve a minimum mean square error.

According to another embodiment of the present invention, there is provided a device for determining tap coefficients of a phase interpolation finite impulse response (FIR) filter with respect to a digital-signal phase-locked loop processing apparatus including an analog-to-digital (A/D) converter configured to receive a reproduced signal serving as digital data and to sample the received reproduced signal at a frequency higher than a data rate frequency and a phase-locked loop (PLL) portion configured to perform phase locking of the reproduced signal by filtering the sampled reproduced signal obtained by the A/D converter using the phase interpolation FIR filter and to output a data sequence of the phase-locked reproduced signal. The device includes the following elements: an adaptive equalization FIR filter operating at the data rate frequency provided at a stage subsequent to the PLL portion; and a calculator configured to determine the tap coefficients of the phase interpolation FIR filter using, as estimated values, FIR filter tap coefficients of the adaptive equalization FIR filter, which are converged so as to achieve a minimum mean square error.

According to yet another embodiment of the present invention, there is provided a phase locking method including the steps of: receiving a reproduced signal serving as digital data and sampling the received reproduced signal at a frequency higher than a data rate frequency; and performing phase locking of the reproduced signal by filtering the sampled reproduced signal using a phase interpolation finite impulse response (FIR) filter and outputting a data sequence of the phase-locked reproduced signal. Tap coefficients of the phase interpolation FIR filter have predetermined frequency characteristics, and the phase interpolation FIR filter performs both the phase locking and equalization.

According to a further embodiment of the present invention, there is provided a phase locking apparatus including the following elements: an analog-to-digital (A/D) converter configured to receive a reproduced signal serving as digital data and to sample the received reproduced signal at a frequency higher than a data rate frequency; and a phase-locked loop (PLL) portion configured to perform phase locking of the reproduced signal by filtering the sampled reproduced signal obtained by the A/D converter using a phase interpolation finite impulse response (FIR) filter and to output a data sequence of the phase-locked reproduced signal. Tap coefficients of the phase interpolation FIR filter have predetermined frequency characteristics, and the phase interpolation FIR filter performs both the phase locking and equalization.

DESCRIPTION OF THE PREFERRED EMBODIMENTS

A digital-signal-processing phase-locked loop (PLL) circuit using an interpolated timing recovery (ITR) scheme (may also be referred to as an "ITR digital PLL circuit") and a method of calculating tap coefficients of an interpolation FIR filter according to embodiments of the present invention will be described.

Block Diagram of Optical Disk Player

Figure 1:
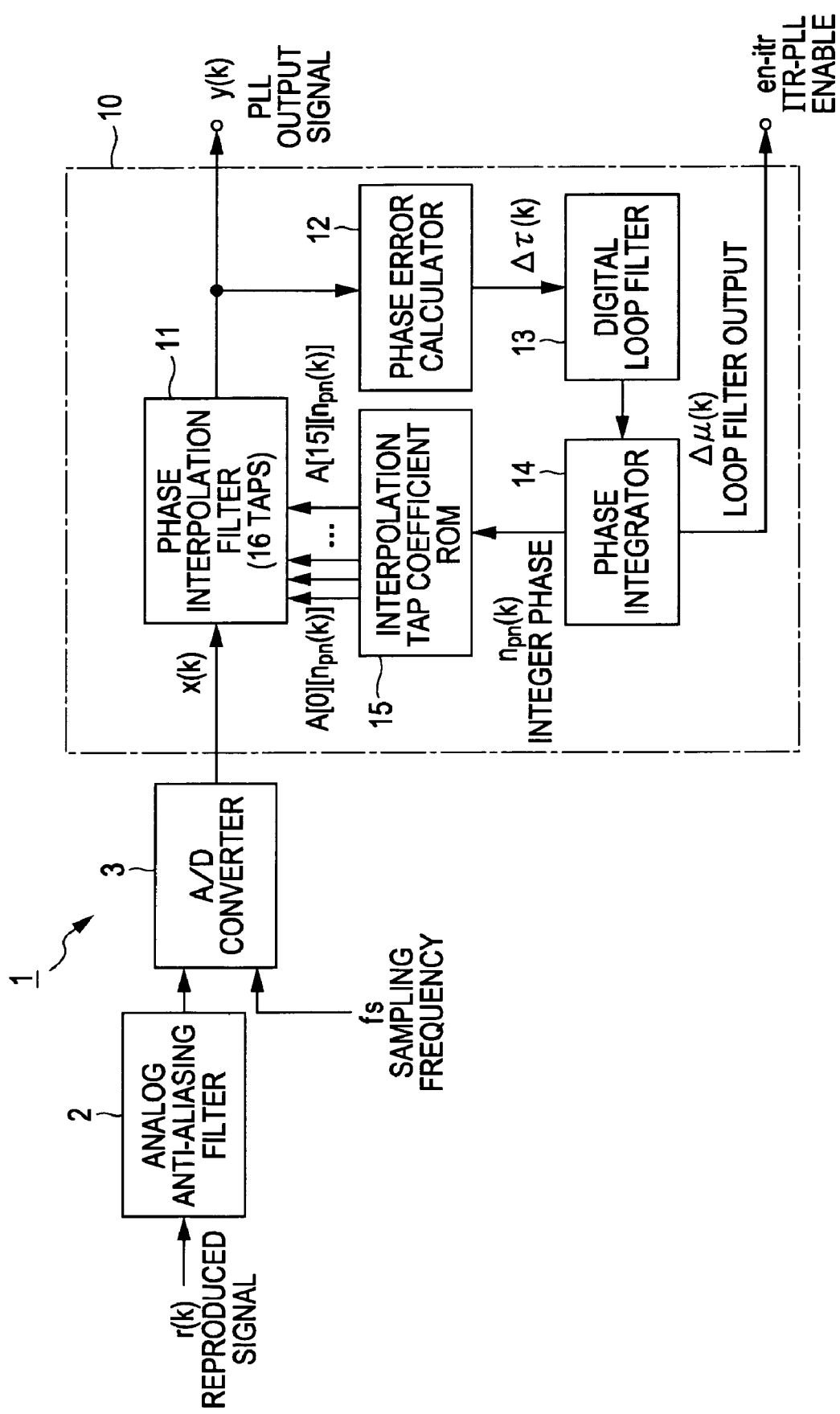
FIG. 1 is a block diagram of an optical disk reproduced signal processor including an ITR digital PLL circuit.

FIG. 1 is a block diagram of an optical disk reproduced signal processor 1 including an ITR digital PLL circuit.

The optical disk reproduced signal processor 1 includes, as shown in FIG. 1, an analog anti-aliasing filter 2, an A/D converter 3 that performs analog-to-digital conversion, and an ITR digital PLL circuit 10.

The ITR digital PLL circuit 10 includes a phase interpolation filter 11 that interpolates an output signal of the A/D converter 3, a phase error calculator 12 that calculates a phase error between the input and the output of the phase interpolation filter 11, a digital loop filter 13 that filters an output signal of the phase error calculator 12, a phase integrator 14 that integrates an output signal of the digital loop filter 13, and an interpolation tap coefficient ROM 15 that stores tap coefficients of the phase interpolation filter and that generates and outputs phase interpolation tap coefficients necessary according to a phase value output from the phase integrator 14 to the phase interpolation filter 11.

A reproduced signal r(k) is input from an optical disk to the optical disk reproduced signal processor 1.

The input reproduced signal r(k) is anti-aliased by the analog anti-aliasing filter 2, and thereafter is sampled by the A/D converter 3 into digital data.

The sampling rate of the A/D converter 3 and the operation clock of the digital PLL circuit 10 have a frequency $f_s = \alpha \cdot f_d$ ($\alpha > 1.0$), which is slightly higher than a data rate frequency $f_d$ of the reproduced signal r(k).

The sampled reproduced signal r(k) obtained by the A/D converter 3 is input to the digital PLL circuit 10.

The digital PLL circuit 10 simultaneously performs partial response equalization and phase locking using the ITR scheme.

The partial-response-equalized and phase-locked signal obtained by the digital PLL circuit 10 is output as an output signal y(k) to an external source.

Reproduced Signal r(k)

The reproduced signal r(k) read from the optical disk by a laser at an arbitrary time k is input to the optical disk reproduced signal processor 1. This reproduced signal r(k) passes through the analog anti-aliasing filter 2 and is sampled by the A/D converter 3 at the sampling frequency fs, and an output signal x(k) output from the A/D converter 3 is input to the digital PLL circuit 10.

In this embodiment, a modulation transfer function (MTF) model for use in optical disk simulation, which is described in "Partial-Response Maximum-Likelihood Core Development for CD/DVD Controller Integrated Circuit", G. Sonu, et al., IEEE Transactions on Magnetics, Vol. 37, No. 2, March 2001, pp. 663-669, is applied to generate the reproduced signal r(k), which is input to the optical disk reproduced signal processor 1.

The following equation expresses a transfer function of the MTF model in the frequency domain:

$$h_{MTF}(f_{MTF}) = \frac{2}{\pi} \left[ \cos^{-1}(f_{MTF}) - f_{MTF} \sqrt{1 - f_{MTF}^2} \right] \qquad (2)$$

where $f_{MTF}$ is a frequency standardized to an optical cut-off frequency Fc of the MTF.

Figure 2:
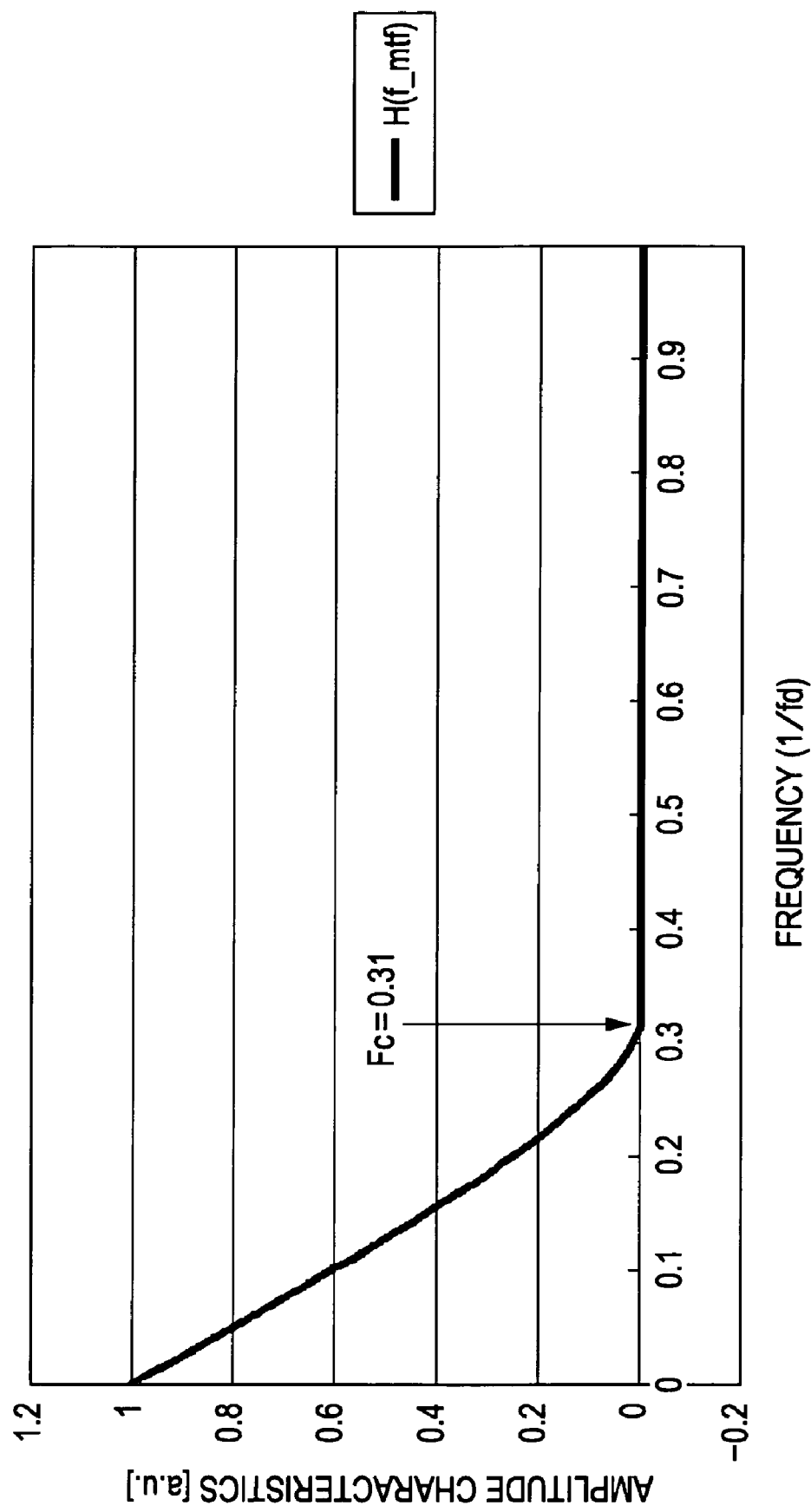
FIG. 2 is a graph showing amplitude characteristics of a modulation transfer function (MTF) channel (Fc=0.31 fd)
Figure 3:
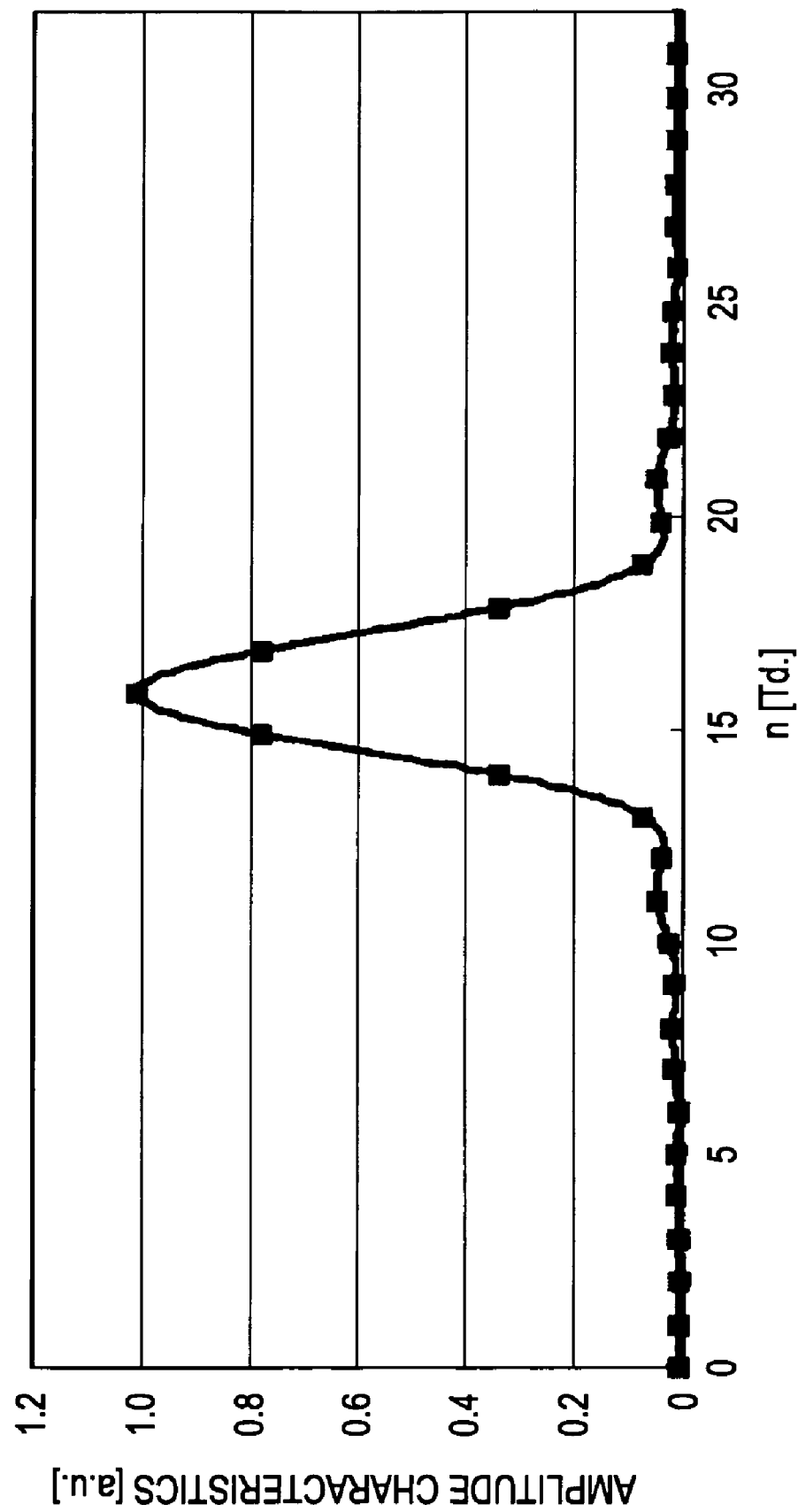
FIG. 3 is a graph showing an MTF channel impulse response (Fc=0.31 fd)

In this embodiment, it is assumed that a Blu-ray disc® channel of about 25 GB is used, and $Fc = 0.31 \cdot fd$. In this case, a frequency response of the MTF channel is shown in FIG. 2, and an impulse response of the MTF channel is shown in FIG. 3. FIG. 2 plots samples of the MTF impulse response taken at the data rate frequency fd, each being $h_{MTF}(k)$: (k=0, 1, 2, ..., 31).

The MTF channel impulse response $h_{MTF}(k)$ shown in equation (2) is convoluted with a random 1-7 pp (parity preserve/prohibit) encoded data code sequence b(k) and superimposed with an additive white Gaussian noise (AWGN), thereby generating the reproduced signal r(k). The AWGN is set to about 24 dB when the data code sequence b(k) is [−1, +1]. This is expressed as:

$$r(k) = \sum_{i=0}^{31} h_{MTF}(k) \cdot b(i-k) + awgn \qquad (3)$$

where awgn is AWGN at the time k.

In this embodiment, the discussion is based on the over-sampling rate of the ITR-PLL set to $fs = (8/7) \cdot fd$.

Each Element of Digital PLL Circuit

Each element of the digital PLL circuit 10 will be described below.

The phase interpolation filter 11 includes, for example, a 16-tap FIR filter expressed as:

$$y(k) = \sum_{i=0}^{15} A[i][n_{ph}(k)] \cdot x(k-i) \qquad (4)$$

-continued y(k): output signal of phase interpolation filter
A[i][n_ph(k)]: i-th tap coefficient
n_ph(k): integer phase output from phase integrator 14 at time k In this embodiment, $n_{ph}(k)$ takes 128 values, namely, [0, ..., 127]. This means that the sampling period Ts of the phase interpolation filter 11 is controlled with an accuracy of (1/128)Ts.

The output signal y(k) of the phase interpolation filter 11 is input to the phase error calculator 12.

The phase error calculator 12 calculates a phase error $\Delta\tau(k)$ using equation (1).

The phase error $\Delta\tau(k)$ calculated by the phase error calculator 12 is input to the digital loop filter 13.

Figure 4:
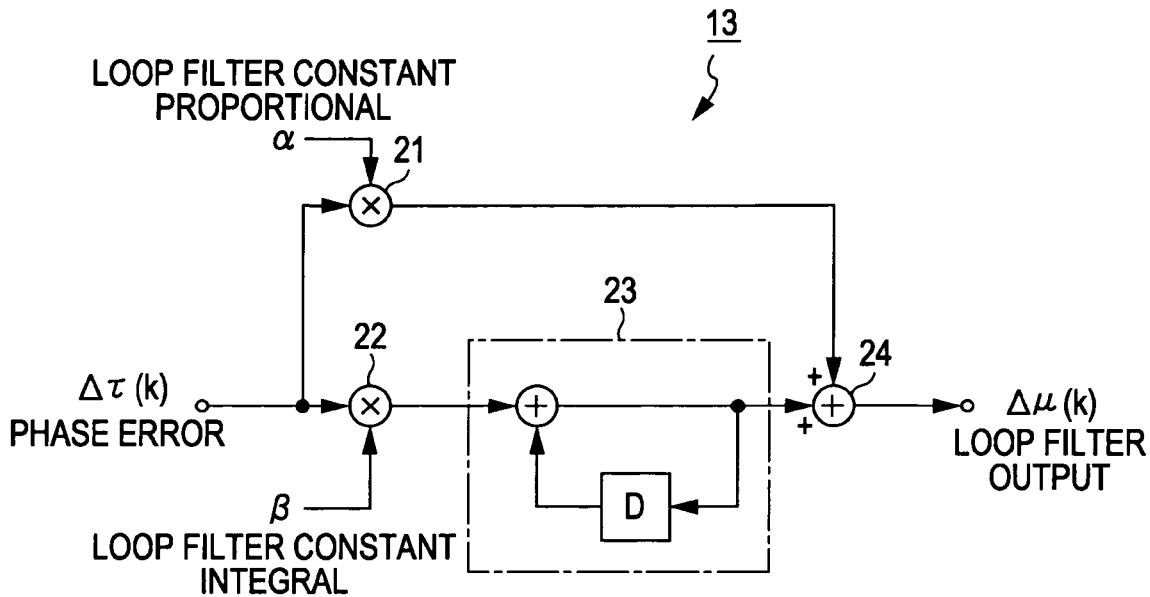
FIG. 4 is a circuit diagram of a digital loop filter.

The digital loop filter 13 has, for example, a circuit configuration shown in FIG. 4. That is, the digital loop filter 13 includes, as shown in FIG. 4, a first multiplier 21, a second multiplier 22, an accumulator 23, and an adder 24.

The first multiplier 21 multiplies the phase error $\Delta\tau(k)$ by a loop filter constant proportional α. The second multiplier 22 multiplies the phase error $\Delta\tau(k)$ by a loop filter constant integral β. The accumulator 23 accumulates an output value of the second multiplier 22. The adder 24 adds an output value of the first multiplier 21 and an output value of the accumulator 23. The digital loop filter 13 outputs an output value of the adder 24 as a loop filter output signal $\Delta\mu(k)$.

The digital loop filter 13 is expressed as:

$$\Delta\mu(k) = \left(\alpha + \frac{\beta}{1-D}\right) \cdot \Delta\tau(k) \quad (5)$$

α: loop filter proportional
β: loop filter integral
D: 1-clock delay element

The output signal $\Delta\mu(k)$ of the digital loop filter 13 is input to the phase integrator 14.

Figure 5:
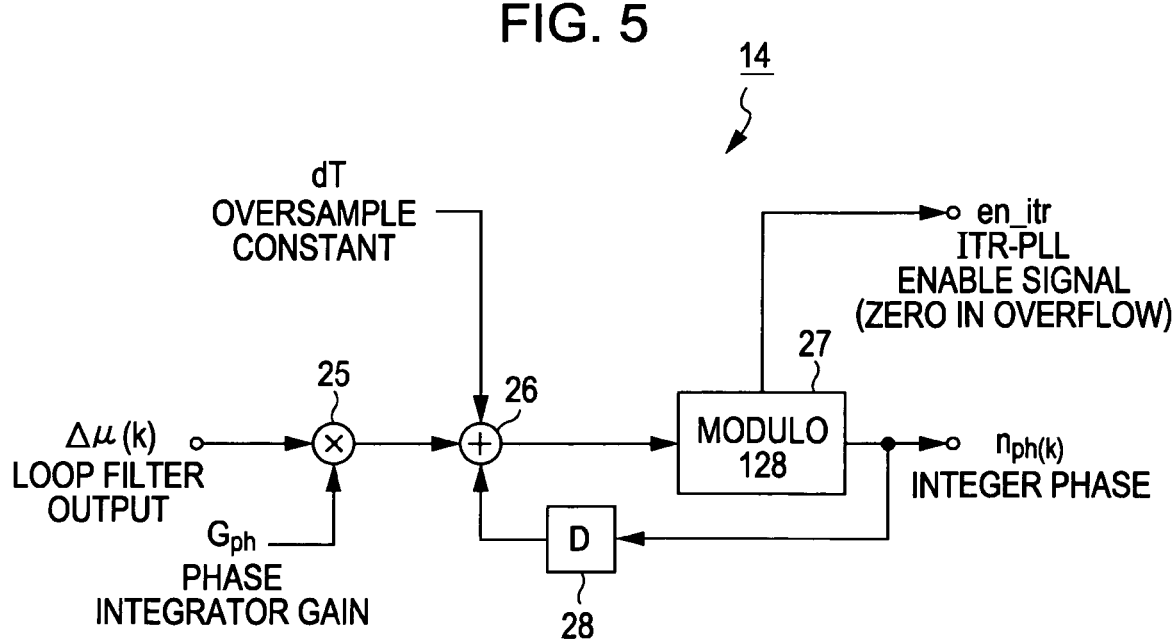
FIG. 5 is a circuit diagram of a phase integrator circuit.

The phase integrator 14 has, for example, a circuit configuration shown in FIG. 5. That is, the phase integrator 14 includes, as shown in FIG. 5, a multiplier 25, an adder 26, a modulo 128 calculator 27, and a 1-clock delay element 28.

The multiplier 25 multiplies the loop filter output $\Delta\mu(k)$ by a predetermined gain (phase integrator gain) $G_{ph}$. The adder 26 adds an output value of the multiplier 25, an oversampling constant dT, and an output value of the 1-clock delay element 28 and outputs the sum. The modulo 128 calculator 27 outputs an integer portion of the remainder of the division of the sum or the output value of the adder 26 by 128. The 1-clock delay element 28 delays an output value of the modulo 128 calculator 27 by one clock. The phase integrator 14 outputs an output value of the modulo 128 calculator 27 as an integer phase $n_{ph}(k)$. Additionally, the phase integrator 14 outputs an ITR-PLL enable signal (en_itr), which is a binary signal that becomes effective (zero in negative logic) at an overflow timing of the modulo 128 calculator 27.

The phase integrator 14 is expressed as:

$$n_{ph}(k)=\text{MOD}(n_{ph}(k-1)+G_{ph}\cdot\Delta\mu(k)+dT,128) \quad (6)$$

$G_{ph}$: desired gain

MOD(v, 128): function with integer portion of remainder of division of v by 128 as return value The oversampling constant dT is a constant with the following relationship between the sampling frequency fs and the data rate frequency fd:

$$dT=1/f_d-1/f_s \quad (7)$$

The enable signal (en_itr) becomes zero (effective) when v of MOD (v, 128) becomes 128 or greater, and otherwise is one (ineffective).

The integer phase $n_{ph}(k)$ output from the phase integrator 14 is input to the interpolation tap coefficient ROM 15. The enable signal (en_itr) output from the phase integrator 14 is output as an enable signal of the output signal y(k) output from the phase interpolation filter 11 to an external source.

The interpolation tap coefficient ROM 15 stores predetermined phase interpolation filter tap coefficients ($A[i][n_{ph}(k)]$) in a two-dimensional sequence, where i is the phase interpolation filter tap coefficient number, and $n_{ph}(k)$ is the integer phase output from the phase integrator 14 at time k. In this embodiment, $n_{ph}(k)$ takes 128 values, namely, [0, ..., 127].

Phase Interpolation Filter Tap Coefficients

Tap coefficients of the phase interpolation filter 11 will be described below.

First of all, a generally known method of determining interpolation tap coefficients using the product of a sinc function and a window function in the time domain and problems of the method will be described. Next, a method of determining sinc-function interpolation filter taps using a frequency sampling technique in the frequency domain will be described. Finally, the determining approach and procedure of minimum MSE-PR interpolation filter tap coefficients using the frequency sampling technique, to which the embodiment of the present invention is applied, will be described.

First, the known method of determining interpolation filter taps using a sinc function and a window function will be described.

A sinc function is shown in equation (8), and a general humming window is shown in equation (9):

$$\text{Sinc}(nT)=\sin(n\pi T)/n\pi T \quad (8)$$

$$w_H(nT)=a+(1-a)\cos(2\pi nT/N_{tap}) \quad (9)$$

where T is a sampling period, $N_{tap}$ is the FIR filter length, and a is a parameter of the general humming window, and $0 \leq a \leq 1$. When a=0.54 or a=0.50, it is called a humming window.

Figure 6:
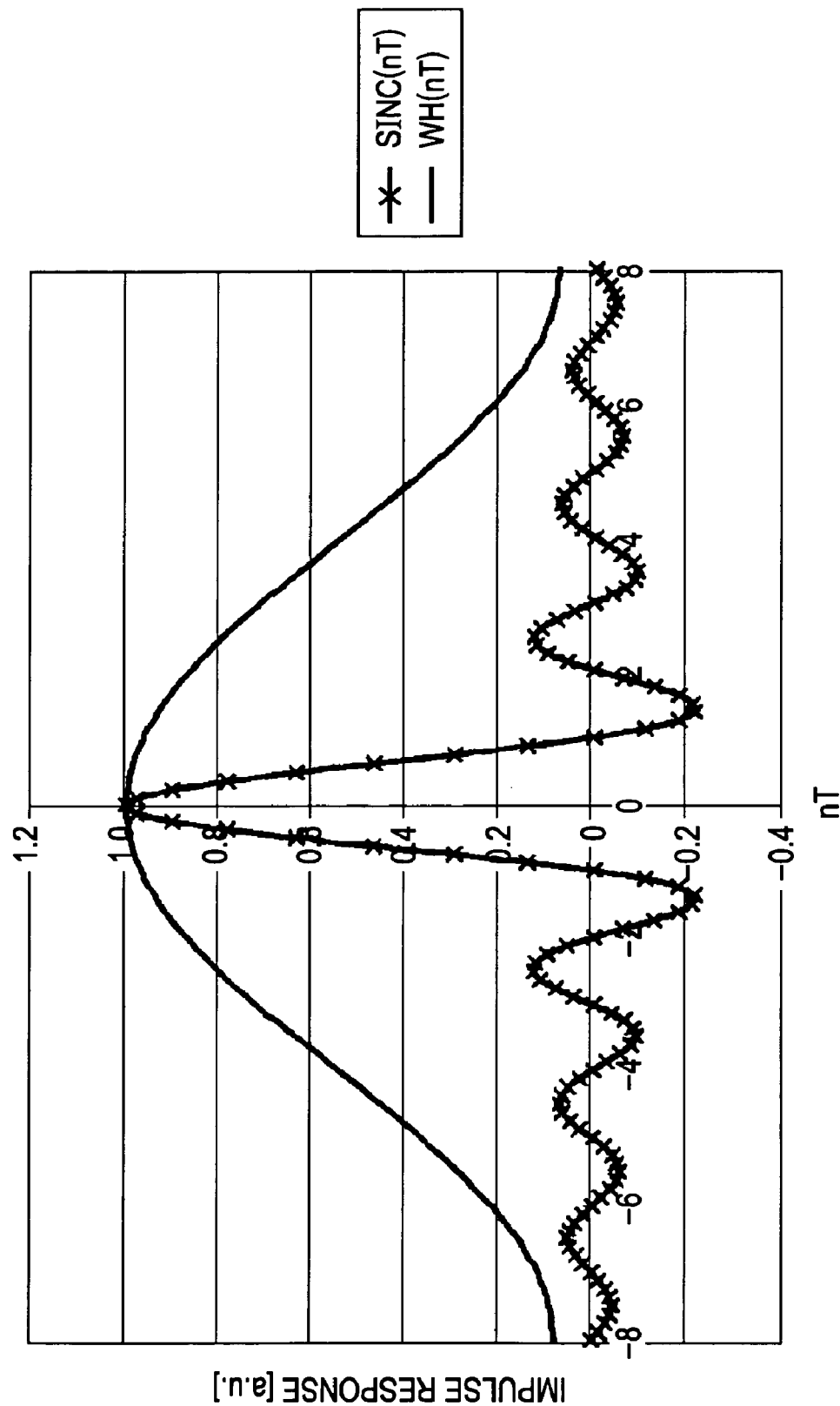
FIG. 6 is a graph showing a sinc function and a window function.
Figure 7:
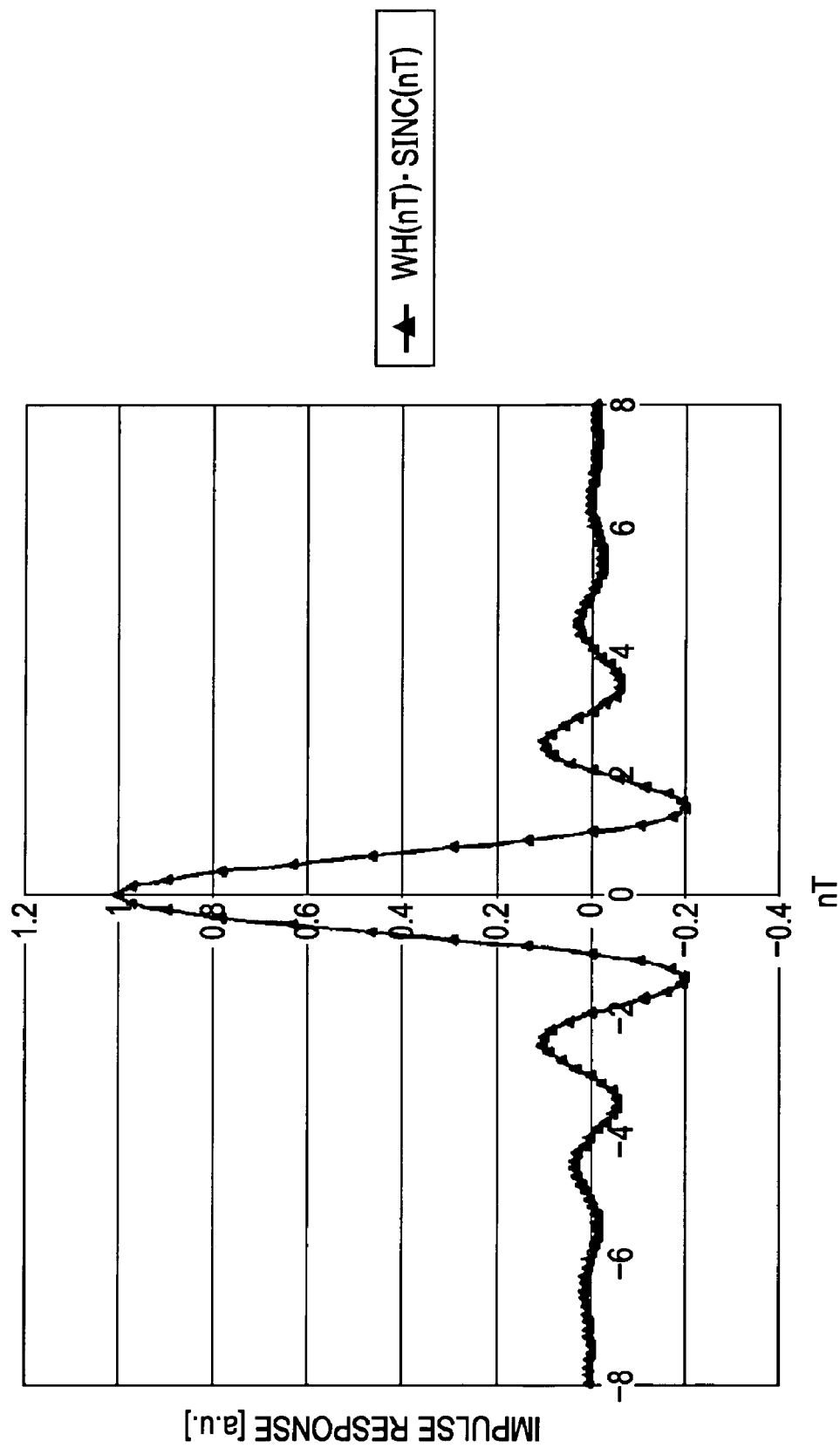
FIG. 7 is a graph showing the product of the sinc function and the window function.

FIG. 6 shows the sinc function and the humming window (a=0.54) when $N_{tap}$=16. FIG. 7 shows the product of the sinc function and the humming window (a=0.54) when $N_{tap}$=16. Here, the oversampling rate, that is, the phase resolution, has a parameter of eight.

In general digital FIR filter design, the Gibbs oscillation of the filter response may be suppressed by multiplying the above-determined impulse response by an appropriate window function.

However, in the case of the phase interpolation filter 11 (filter that also performs partial response equalization), the filter configured to change the phase by shifting the phase is implemented by expressing filter tap coefficients as being oversampled. By multiplying the filter tap coefficients of the phase interpolation filter 11 designed in this manner by a window function in the time domain, it is clear that the characteristics of the filter tap coefficients in the frequency domain are changed when the filter is implemented at each phase resolution point. Therefore, in order to determine logically correct interpolation filter tap coefficients, that is, in order to obtain tap coefficients having the same frequency characteristics at each phase resolution selection point, it is necessary that the characteristics be determined in the frequency domain.

Next, a method of determining tap coefficients of a Nyquist-sinc (NYQ-sinc) interpolation filter using a frequency sampling technique and an oversampling technique in the frequency domain will be described.

In this case, 16 taps, that is, interpolation tap coefficients in the case where the phase resolution is eight, will be determined.

The following equation shows frequency characteristics of a low-pass filter with a roll off:

$$LPF_r(f) = \begin{cases} 1: & (f < (1-r)f_s/2) \\ (1/2)(1 - \sin((\pi/r)(f/f_s - 0.5))): & ((1-r)f_s/2 \le f \le (1+r)f_s/2) \\ 0: & :((1+r)f_s/2 < f) \end{cases} \quad (10)$$

where r is a roll off rate where $0 \le r \le 1$.

Figure 8:
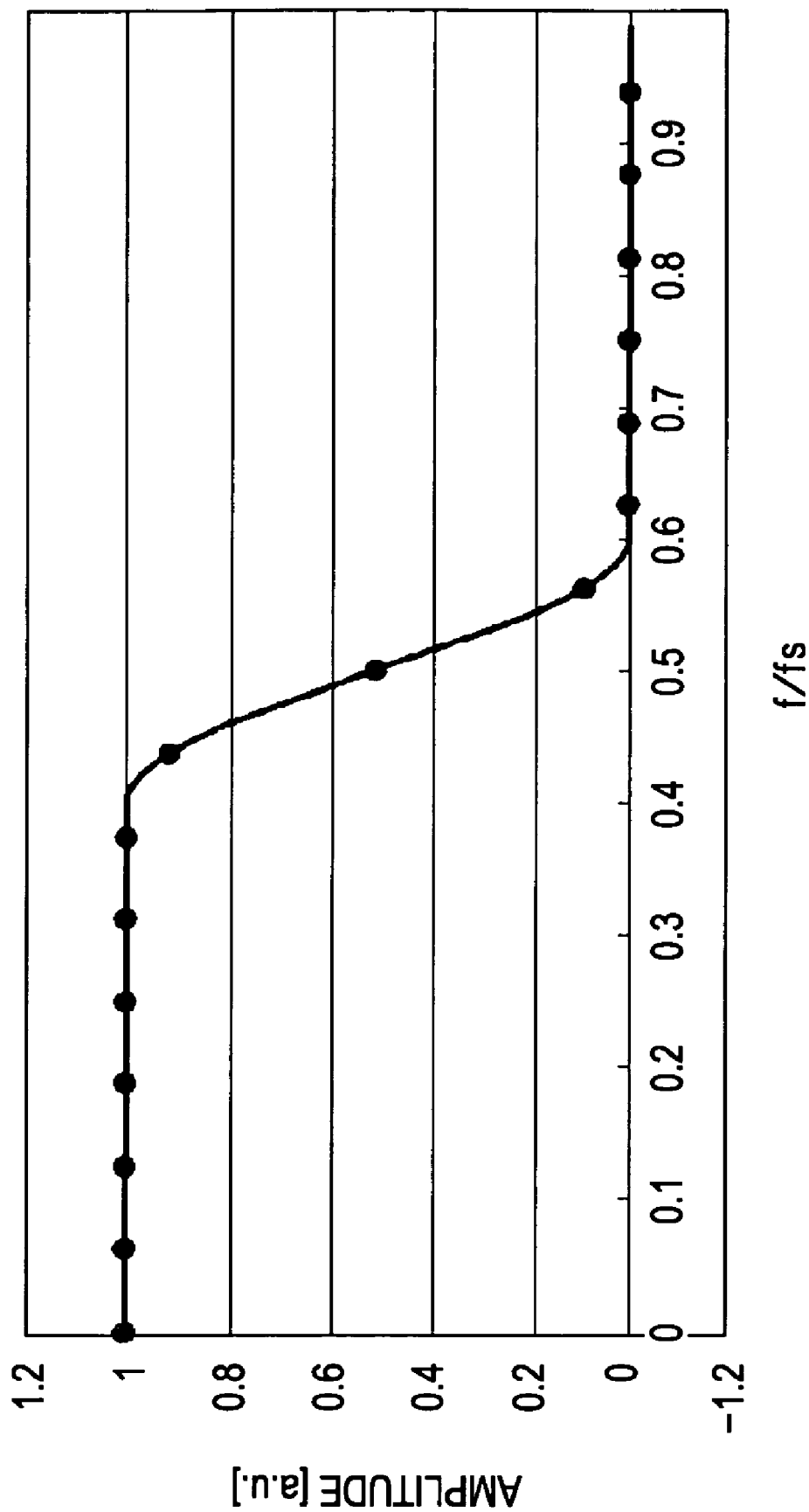
FIG. 8 is a graph showing frequency characteristics of a 16-tap low-pass filter with a roll off r of 0.2.

FIG. 8 shows frequency characteristics of the low-pass filter shown in equation (10).

In FIG. 8, the low-pass filter is standardized to the sampling frequency fs=1.0 and has r=0.2 and 16 taps.

First, 16 sampling points in the frequency domain of the low-pass filter shown in FIG. 8 are prepared. These 16 points correspond to a region up to fs in the frequency domain.

Next, zero is inserted into, among these 16 points, points included in an 8×fs region in the frequency domain so as to correspond to the phase resolution of eight.

Figure 9:
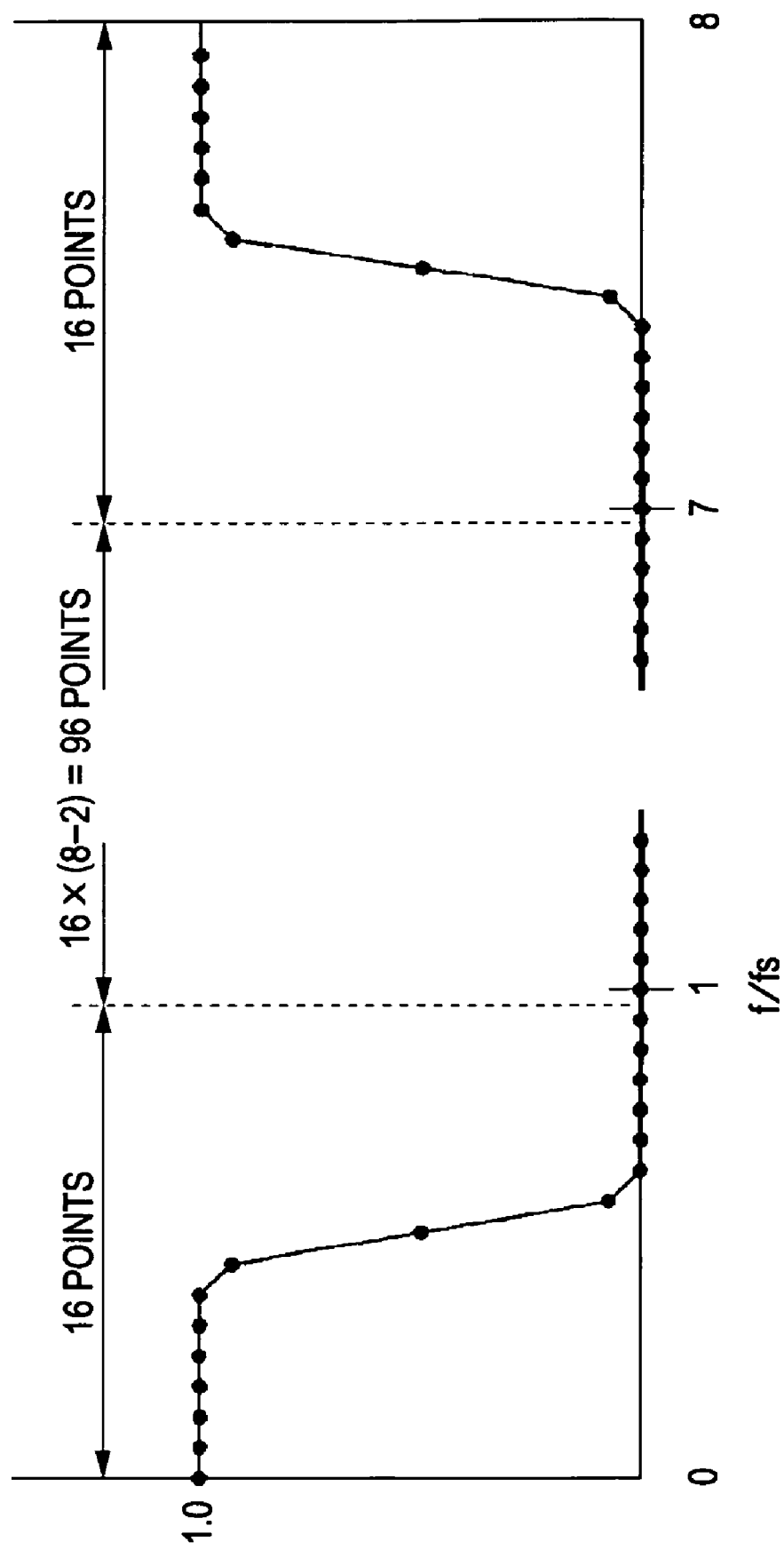
FIG. 9 is a diagram showing a filter design approach using a frequency sampling technique.

Thereafter, these 16 sampling points in the frequency domain of the low-pass filter are horizontally reversed and DC points are subtracted therefrom, and the resulting points are added to the last 16 points of a total of 16×8=128 sampling points, as shown in FIG. 9. As a result, the necessary sampling points in the frequency domain are obtained. Thereafter, a discrete inverse Fourier transform (DIFT) of these 128 points is taken to obtain an impulse response, and the phase of the obtained impulse response is shifted 180 degrees.

With the processing described above, the impulse response shown in FIG. 10 is obtained. The impulse response forms a data sequence representing the tap coefficients of the NYQ-sinc interpolation filter.

Since the data sequence is obtained by converting the response, which is constant in the frequency domain, into the time domain, any selected phase has the same frequency characteristics.

Figure 10:
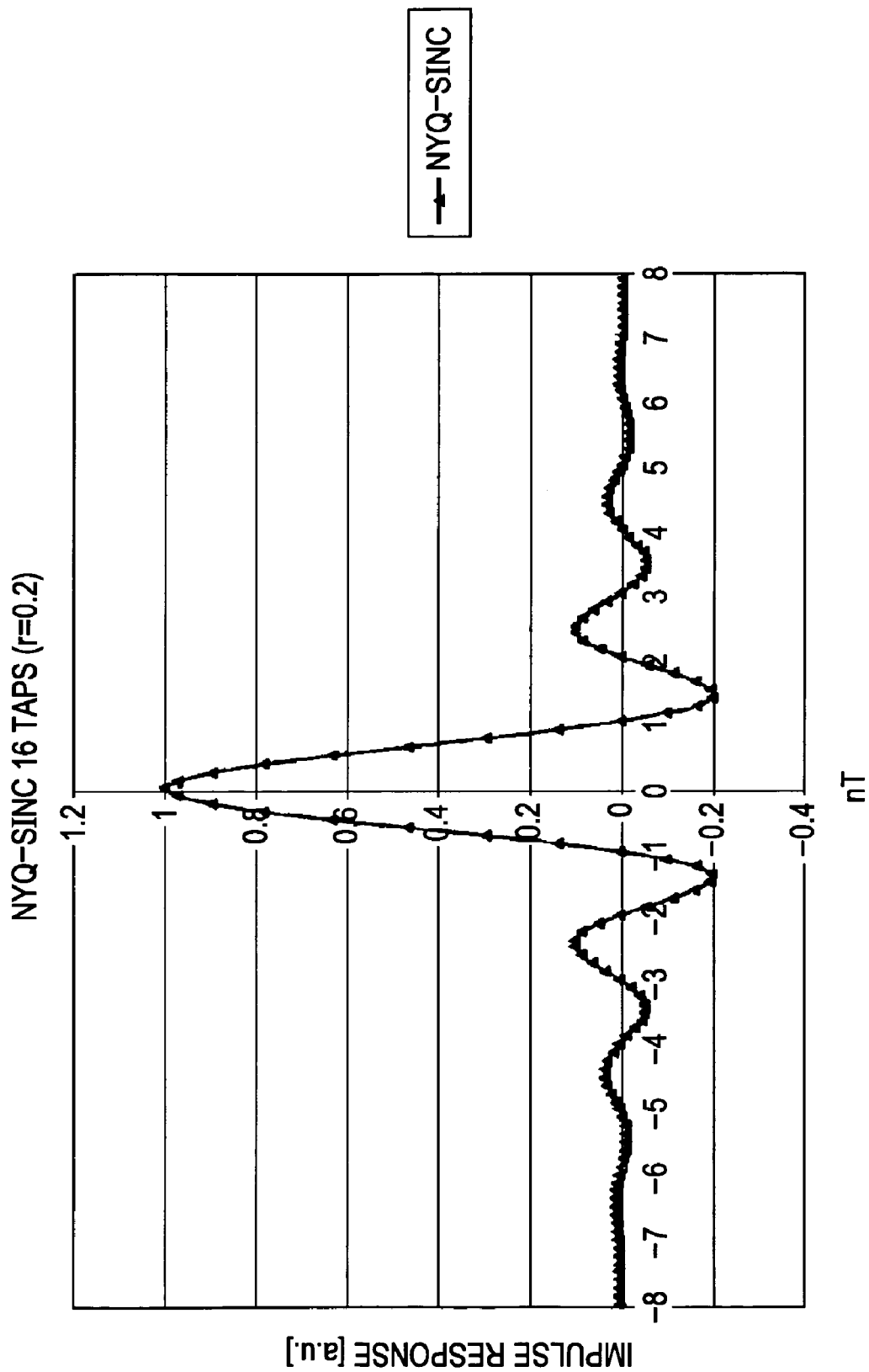
FIG. 10 is a graph showing a data sequence of Nyquist (NYQ)-sinc interpolation filter tap coefficients.

Next, the NYQ-sinc interpolation filter tap coefficients shown in FIG. 10 are correlated with the tap coefficients (A[i][$n_{ph}$(k)]) shown in equation (4).

Figure 11:
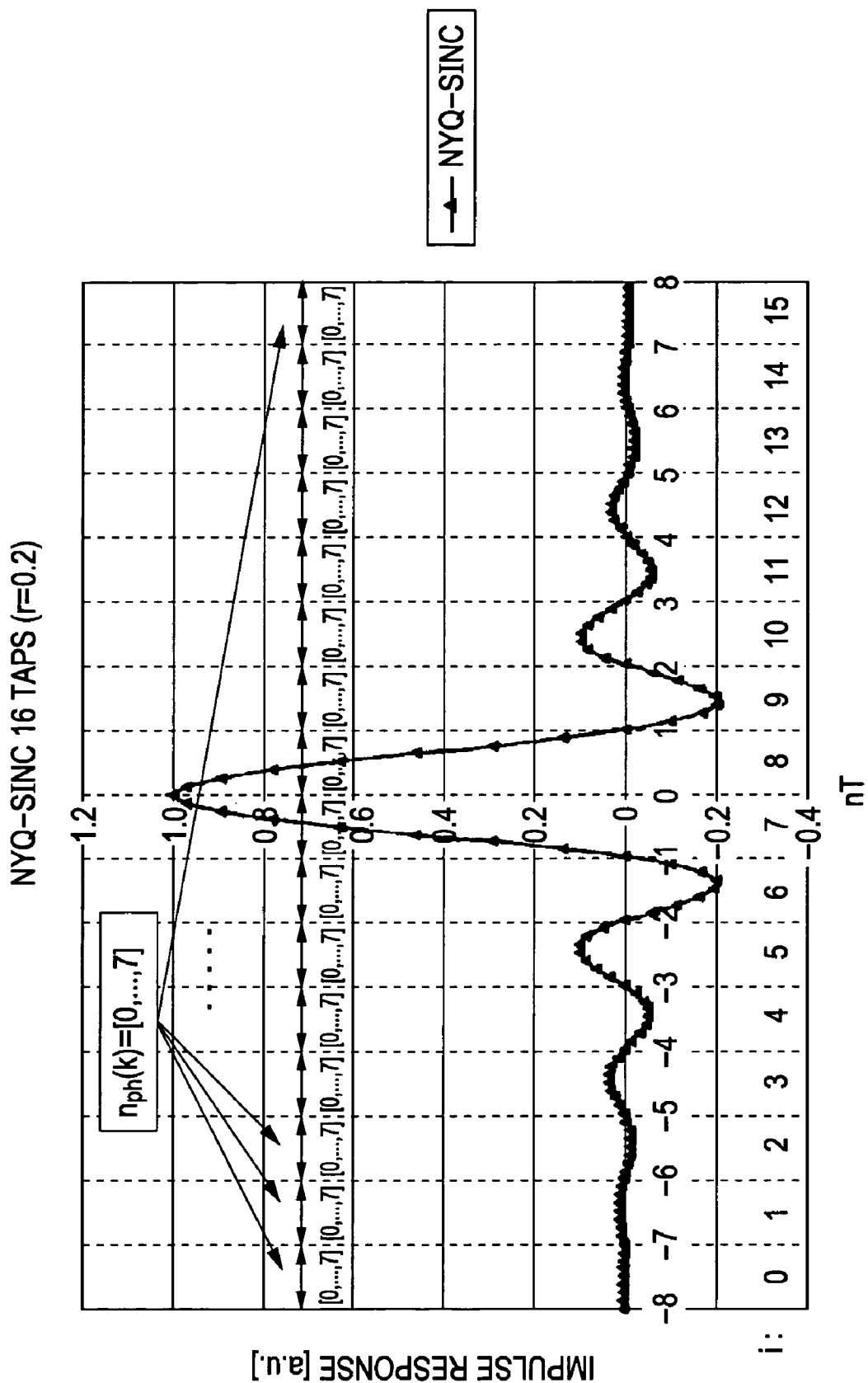
FIG. 11 is a graph showing mapping to the interpolation filter tap coefficient sequence shown in FIG. 10.

FIG. 11 shows the correlation between the NYQ-sinc interpolation filter tap coefficients shown in FIG. 10 and the tap coefficients (A[i][$n_{ph}$(k)]) shown in equation (4). In addition to the impulse response, the indices i and $n_{ph}$(k) are shown. The vertical broken lines in FIG. 11 show the division of a region into subregions, each indicated by the phase interpolation filter tap coefficient number i, and each i subregion is divided by the integer phase $n_{ph}$(k) output from the phase integrator 14 at time k. In FIGS. 10 and 11, for the sake of simplification, the phase resolution denoted by $n_{ph}$(k) divides each i subregion into eight equal portions [0, 1, . . . , 7].

As has been described above, the tap coefficients of the NYQ-sinc interpolation filter can be determined using the frequency sampling technique and the oversampling technique in the frequency domain.

In the embodiment of the present invention, even when the form of expression of the interpolation filter tap coefficients (such as that as shown in FIG. 10) changes, interpolation tap coefficients are generated using a similar procedure. In the following description, the case of interpolation filter tap coefficients with frequency characteristics different from those of the NYQ-sinc type will be discussed. A determining procedure employed in this case is basically the same as the calculations performed in the NYQ-sinc type. That is, the frequency sampling technique and the oversampling technique in the frequency domain are used, and the results are mapped to interpolation filter tap coefficients, as shown in FIG. 11.

Next, the determining approach and procedure of the minimum MSE-PR interpolation filter tap coefficients using the frequency sampling technique, to which the embodiment of the present invention is applied, will be described.

Figure 12:
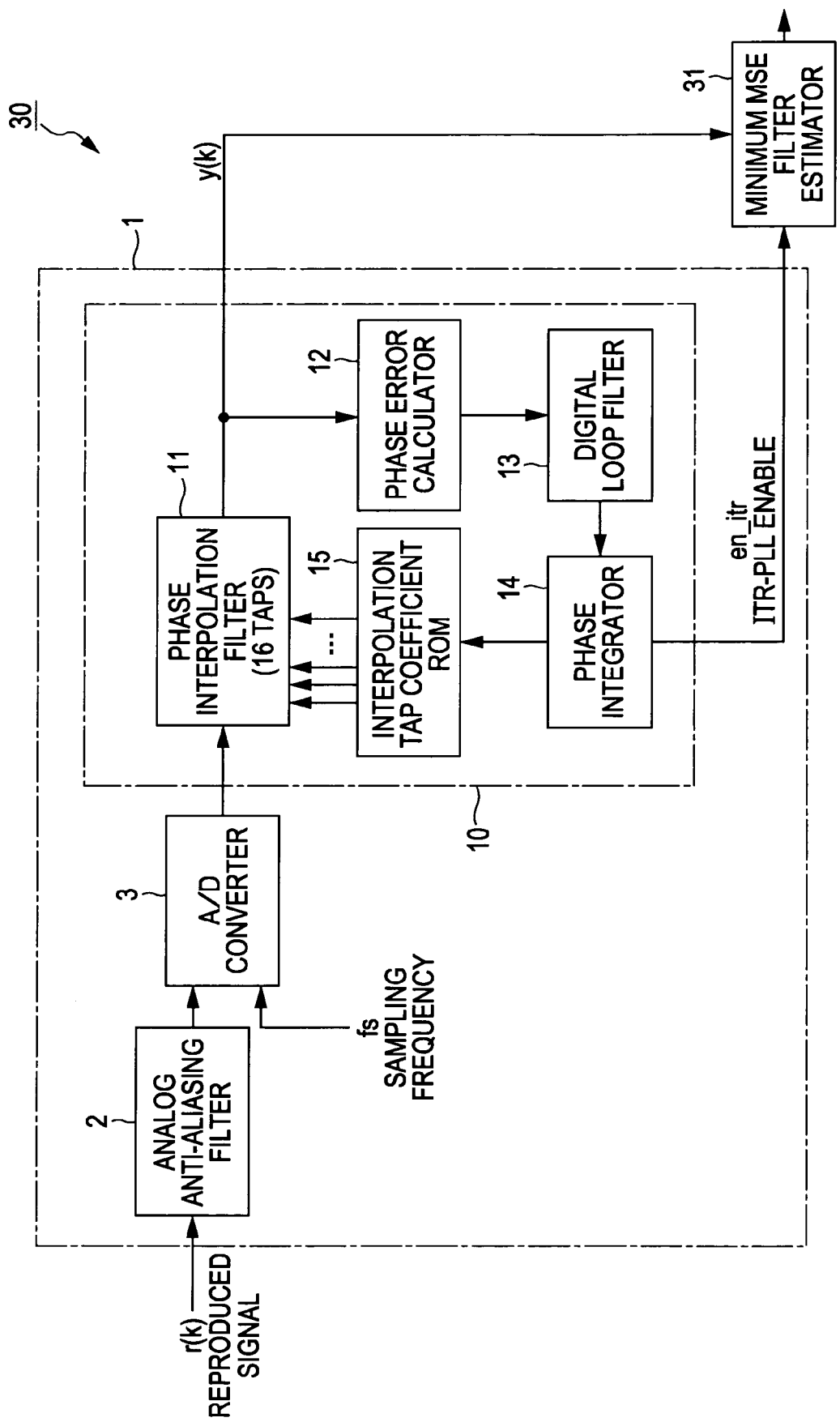
FIG. 12 is a block diagram of a simulation model of the optical disk reproduced signal processor including a minimum mean square error (MSE) filter estimator.

FIG. 12 shows the configuration of a simulation model 30 for calculating the minimum MSE interpolation filter tap coefficients.

The simulation model 30 includes, as shown in FIG. 12, the disk reproduced signal processor 1 and a minimum MSE filter estimator 31 that estimates an equalization error with respect to a predetermined equalization target.

The output signal y(k) of the phase interpolation filter 11 in the ITR digital PLL circuit 10 and the ITR-PLL enable signal are input to the minimum MSE filter estimator 31.

The output signal y(k) is in synchronization with the sampling frequency fs. As in the general case of oversampling ITR digital PLL, a data sequence is output at a bitrate substantially equivalent to the data rate frequency fd by discarding an unnecessary signal with a predetermined interval. A signal that represents an effective portion of the data is the enable signal en_itr.

Figure 13:
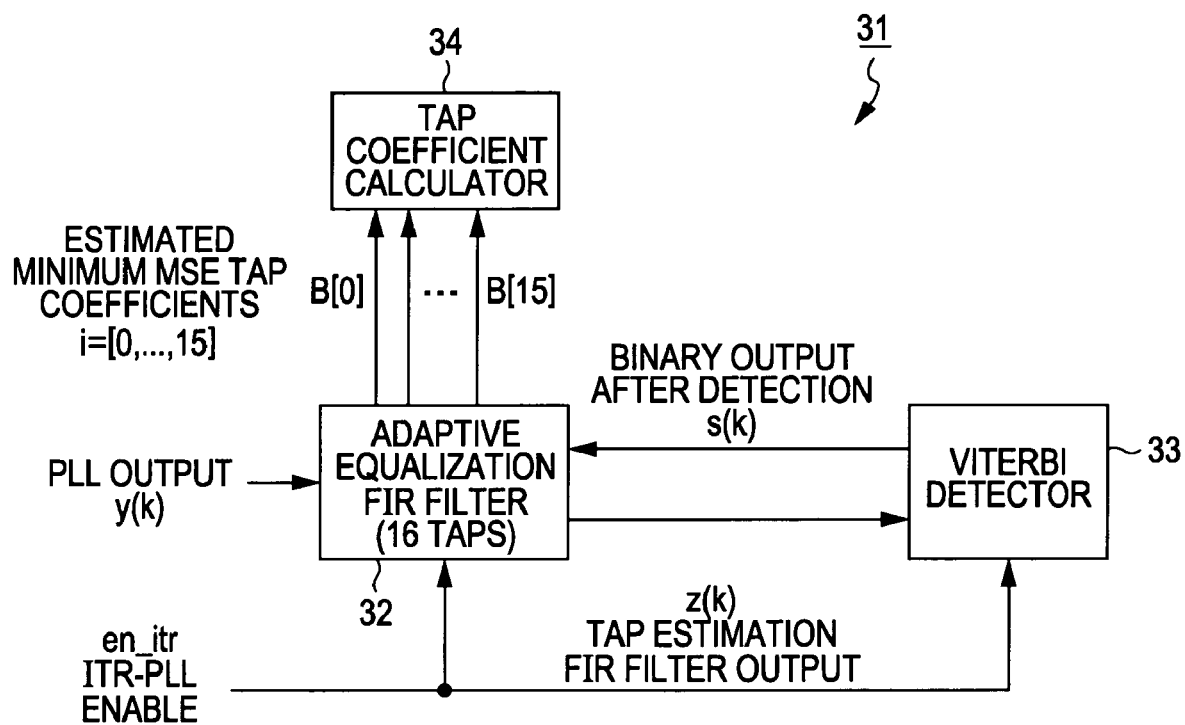
FIG. 13 is a functional block diagram of the internal configuration of the minimum MSE filter estimator.

FIG. 13 is a functional block diagram of the minimum MSE filter estimator 31.

The minimum MSE filter estimator 31 includes an adaptive equalization FIR filter 32, a Viterbi detector 33, and a calculator 34.

The received output signal y(k) is input to the adaptive equalization FIR filter 32. A filtered signal z(k) obtained by the adaptive equalization FIR filter 32 is input to the Viterbi detector 33. The Viterbi detector 33 is a unit that performs Viterbi detection corresponding to the partial response. A binary output signal s(k) subsequent to the Viterbi detection is again input to the adaptive equalization FIR filter 32.

The adaptive equalization FIR filter 32 performs the filtering by extracting only a signal value necessary for the enable signal en_itr. The adaptive equalization FIR filter 32 optimizes the FIR tap coefficients to achieve the minimum MSE using, for example, a least mean square (LMS) algorithm, a recursive least-squares (RLS) algorithm, or the like. In this embodiment, the 16-tap adaptive equalization FIR filter employs the LMS algorithm to converge tap coefficients B[i]: i=0, 1, 2, . . . , 15 using a sufficiently long signal sequence.

The detection result s(k) of the Viterbi detector 33 under the control of the enable signal en_itr is used as a reference signal for the adaptive equalization FIR filter 32.

The calculator 34 calculates tap coefficients of the phase interpolation filter 11 (namely, tap coefficients to be stored in the interpolation tap coefficient ROM 15) by performing the above-described determining procedure (using the frequency sampling technique and the oversampling technique in the frequency domain) with respect to the converged tap coefficients B[i]: i=0, 1, 2, ..., 15.

Specifically, the following processing is performed.

Figure 14:
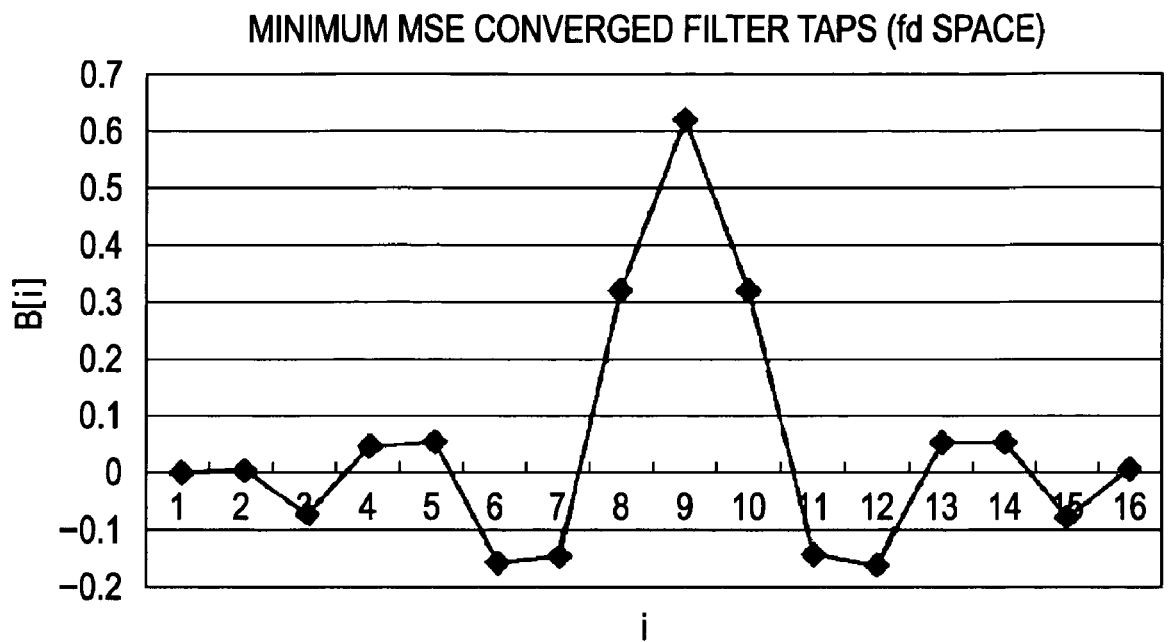
FIG. 14 is a graph showing minimum MSE converged filter taps (fd space)

First, the calculator 34 reads the converged tap coefficients B[i]: i=0, 1, 2, ..., 15 of the adaptive equalization FIR filter 32 in the minimum MSE filter estimator 31. FIG. 14 shows examples of these tap coefficients. Each data sequence of the read tap coefficients B[i] is arranged with the time interval Td=1/fd.

Figure 15:
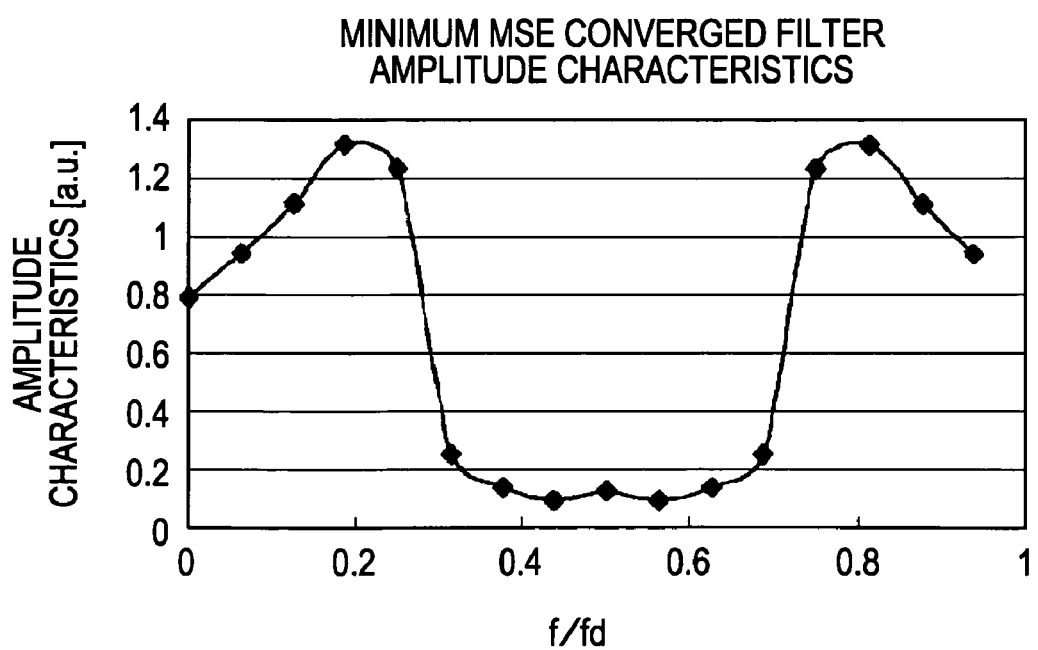
FIG. 15 is a graph showing minimum MSE converged filter amplitude characteristics.

Next, each data sequence of the read tap coefficients B[i] is converted by a DFT into the frequency domain. FIG. 15 shows the results of conversion of the tap coefficients B[i] shown in FIG. 14 by a DFT into the frequency domain.

Next, the data sequence converted into the frequency domain is oversampled 8 times using the sinc function.

Thereafter, a DIFT of the oversampled data sequence is taken to obtain NYQ-sinc interpolation filter tap coefficients in the time domain.

Figure 16:
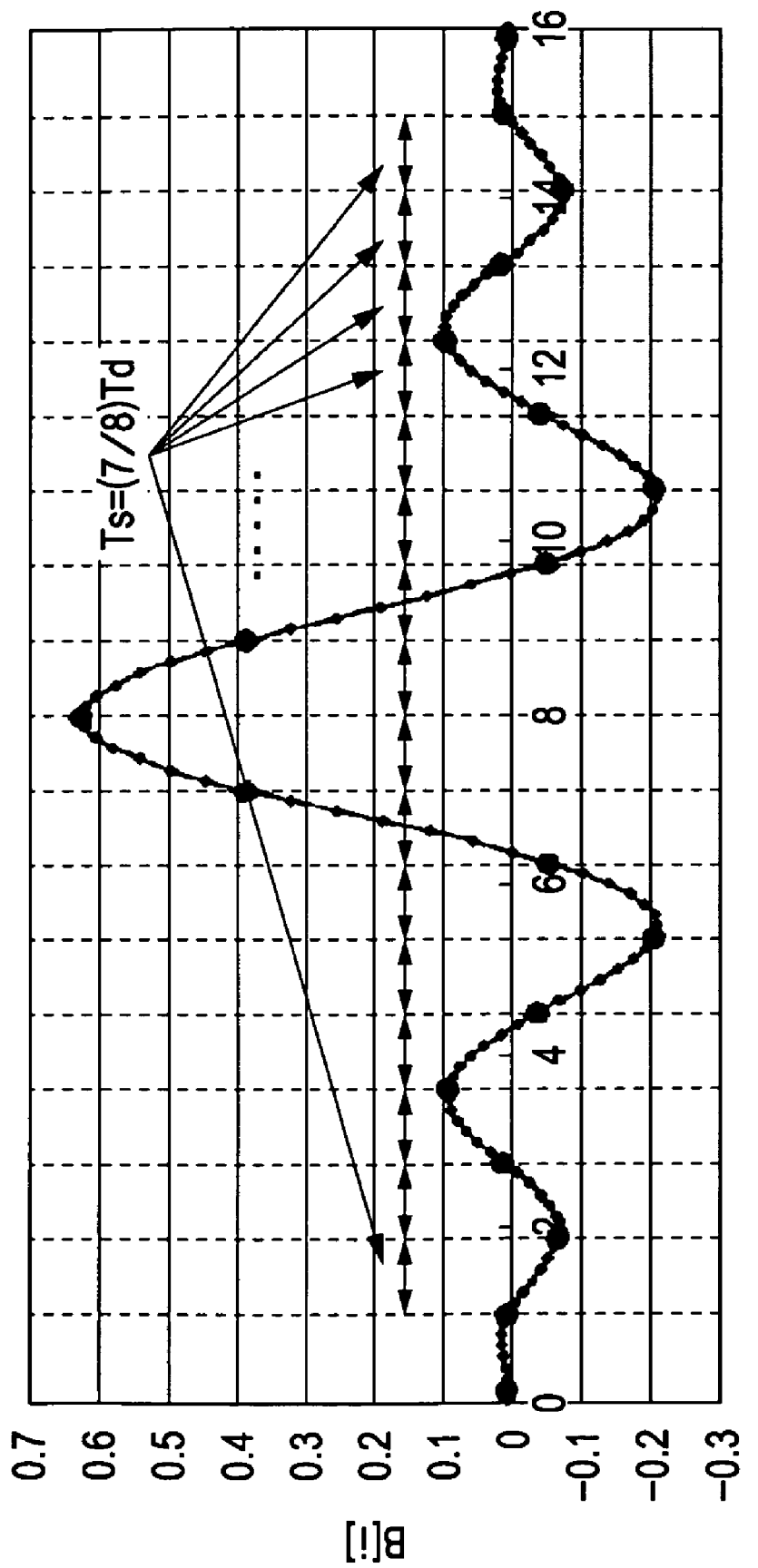
FIG. 16 is a graph showing the results of resampling converged tap coefficients B[i]·(⅞)

Next, the NYQ-sinc interpolation filter tap coefficients are correlated with the tap coefficients (defined as Brs[i]: i=0, 1, ..., 15) to be stored in the interpolation tap coefficient ROM 15. The maximum value of the impulse response serving as a resampling reference is fixed to Brs[8] corresponding to the center tap of the FIR filter, and thereafter, each component is selected. FIG. 16 shows the oversampled data sequence and the resampled points with the time interval Ts=1/fs=(⅞) in the horizontal (level) axis direction, with respect to the reference point at the center, which is the maximum value of the impulse response, which are correlated with Brs[i]: i=0, 1, ..., 15.

Figure 17:
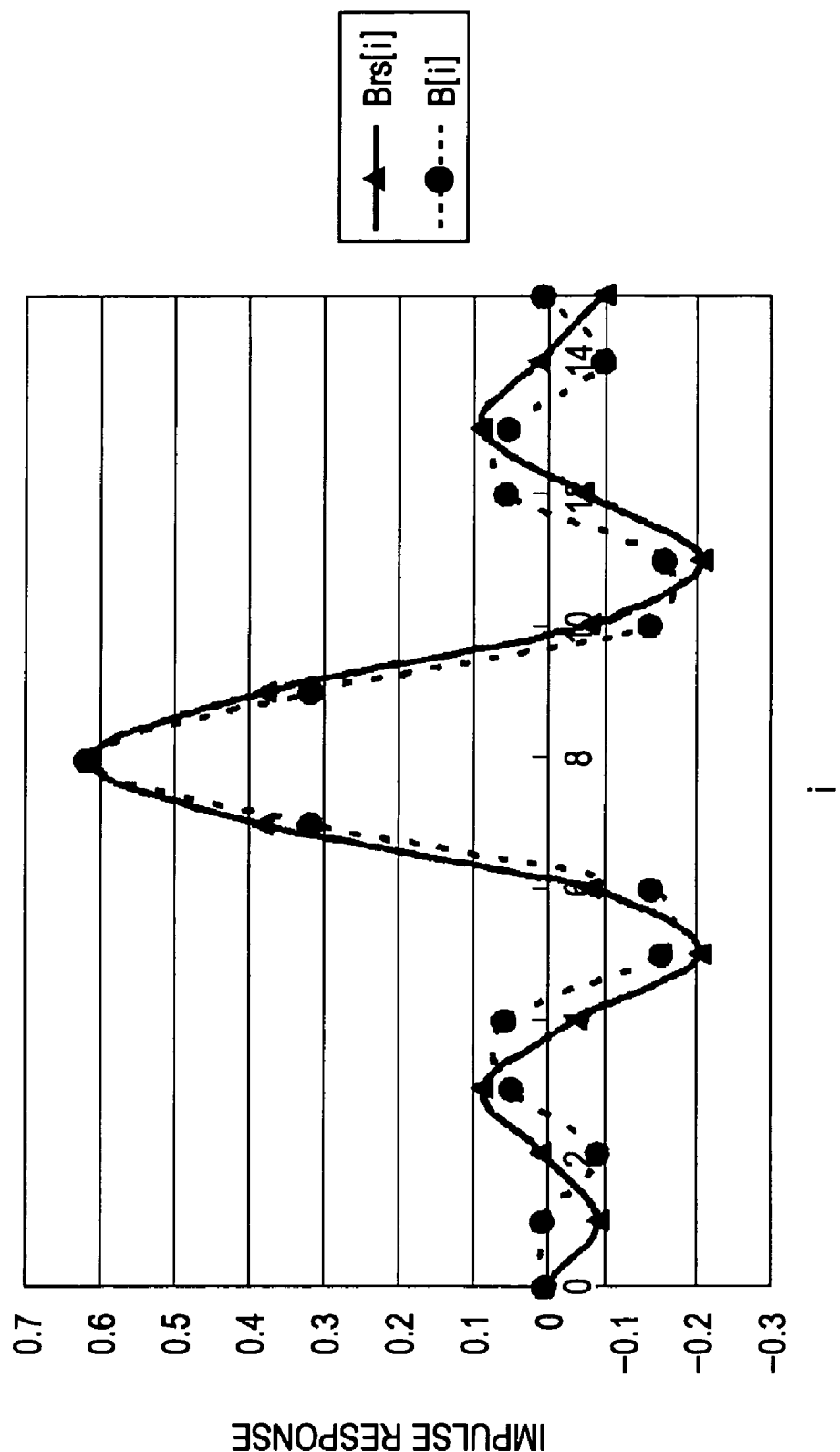
FIG. 17 is a graph showing the converged FIR tap coefficients B[i]: i=0, 1, . . . , 15 and the impulse response Brs[i]: i=0, 1, . . . , 15 obtained by resampling the converged FIR tap coefficients B[i] with a time interval Ts=1/fs=(⅞)·Td.
Figure 18:
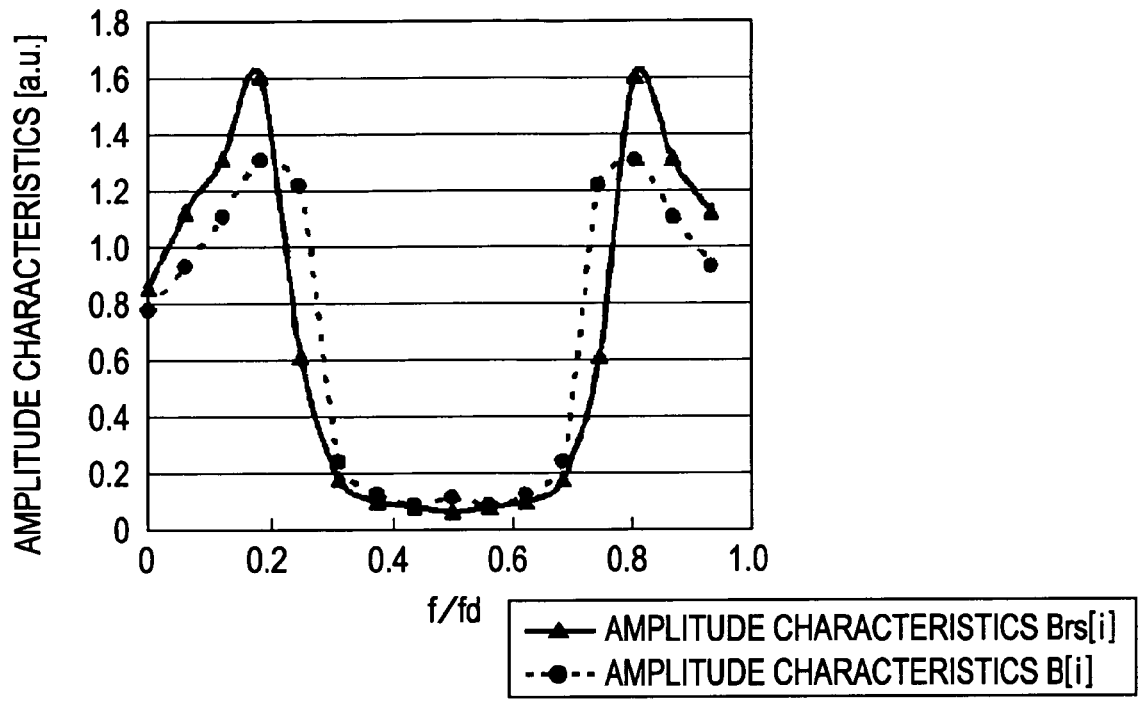
FIG. 18 is a graph showing the tap coefficients shown in FIG. 17 converted by a discrete Fourier transform (DFT) into the frequency domain.

FIG. 17 shows the converged FIR tap coefficients B[i]: i=0, 1, ..., 15 serving as the impulse response sampled with the time interval Td, and Brs[i]: i=0, 1, ..., 15 serving as the impulse response obtained by resampling the converged FIR tap coefficients B[i] with the time interval Ts=1/fs=(⅞)·Td. FIG. 18 shows both B[i] and Brs[i] converted by a DFT into the frequency domain.

The calculator 34 stores the calculated two-dimensional sequence (B[i][$n_{ph}$(k)]) in the interpolation tap coefficient ROM 15.

Figure 19:
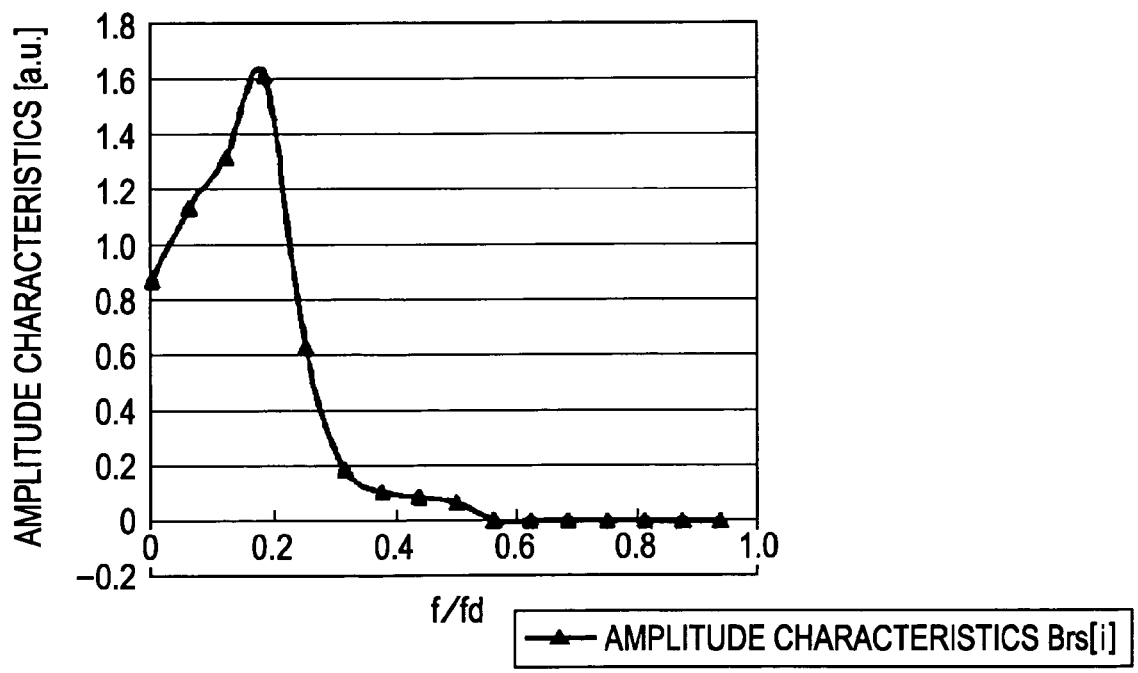
FIG. 19 is a graph showing amplitude characteristics of the resampled impulse response obtained by maintaining portions corresponding to Brs[i]: i=0, 1, . . . , 8 while setting zero to portions corresponding to i=9, . . . , 15.

To determine the phase interpolation filter tap coefficients using the frequency sampling technique, the amplitude characteristics of Brs[i]: i=0, 1, ..., 15 shown in FIG. 17 are used, and portions corresponding to Brs[i]: i=0, 1, ..., 8 are maintained, while setting zero to portions corresponding to i=i=9, ..., 15, as shown in FIG. 19. The resulting amplitude characteristics replace the amplitude characteristics obtained when the NYQ-sinc function is determined, which are shown in FIG. 8, and interpolation filter tap coefficients are determined using the frequency sampling technique. The phase resolution is 128, which is a parameter used in the simulation. Thus, the number of zero points inserted into the frequency characteristics shown in FIG. 9 is 16×(128−2)=2016, and the total number of pieces of data is 2048.

Figure 20:
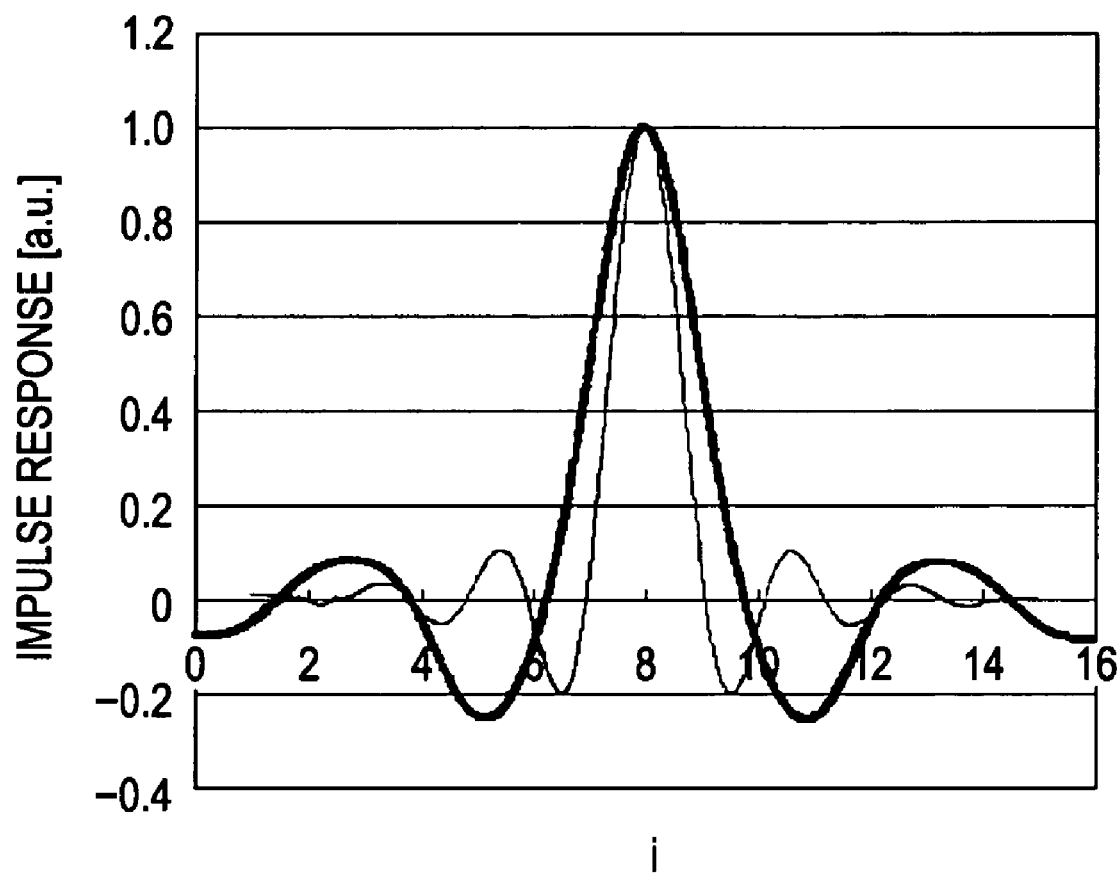
FIG. 20 is a graph showing tap coefficients of interpolation (ITP) (MSE-PR) and ITP (NYQ-sinc)

FIG. 20 shows a data sequence of the minimum MSE-PR impulse response and the NYQ-sinc impulse response shown in FIG. 10. In FIG. 20, the center of both the impulse responses is standardized to 1.0.

In the following discussion, for the sake of simplification, an example in which the data sequence of the minimum MSE-PR impulse response shown in FIG. 20 is mapped to the phase interpolation filter tap coefficients (A[i][$n_{ph}$(k)]), as in FIG. 11, is referred to as "ITP (MSE-PR)", and an example in which the NYQ-sinc impulse response shown in FIG. 20 is mapped to the phase interpolation filter tap coefficients is referred to as "ITP (NYQ-sinc)". In these examples, an auto-gain control (AGC) unit is provided to automatically adjust the amplitude of a signal to maintain the optimal amplitude, thereby maintaining the amplitude of the output of the digital PLL circuit at a constant value.

Advantages

Regarding, for comparison, the output signal of the ITR digital PLL using ITP (NYQ-sinc) serving as the interpolation filter tap coefficients having frequency characteristics of the low-pass filter with a roll off of 0.2, and the output signal of the ITR digital PLL using ITP (MSE-PR) serving as the minimum MSE interpolation filter with respect to the PR1221 equalization target, which is determined with the procedure in the embodiment, comparisons are made between the eye diagrams thereof and between the signal and distortion to noise ratio (SDNR) thereof, and between variances of the output value Δτ of the phase error calculator 12 in the two cases (ITP (NYQ-sinc) and ITP (MSE-PR)), which is calculated using equation (1).

The SDNR is calculated by convoluting the bit data obtained using the detector with the PR1221 partial response to yield a reference signal, calculating an error between the reference signal and the actual PLL output signal, and calculating the squared error variance $\sigma^2$. That is, the SDNR is defined as:

$$SDNR = 10 \log_{10}(S^2/\sigma^2) \quad (11)$$

In the above, S is the reference amplitude 1.0 when the reference level is defined as (+6, +4, +2, 0, −2, −4, −6) in the case where a d−1 limited data code is convoluted with PR1221. As has been described above, AWGN is set to about 24 dB when the data code sequence b(k) is [−1, +1].

Figure 21:
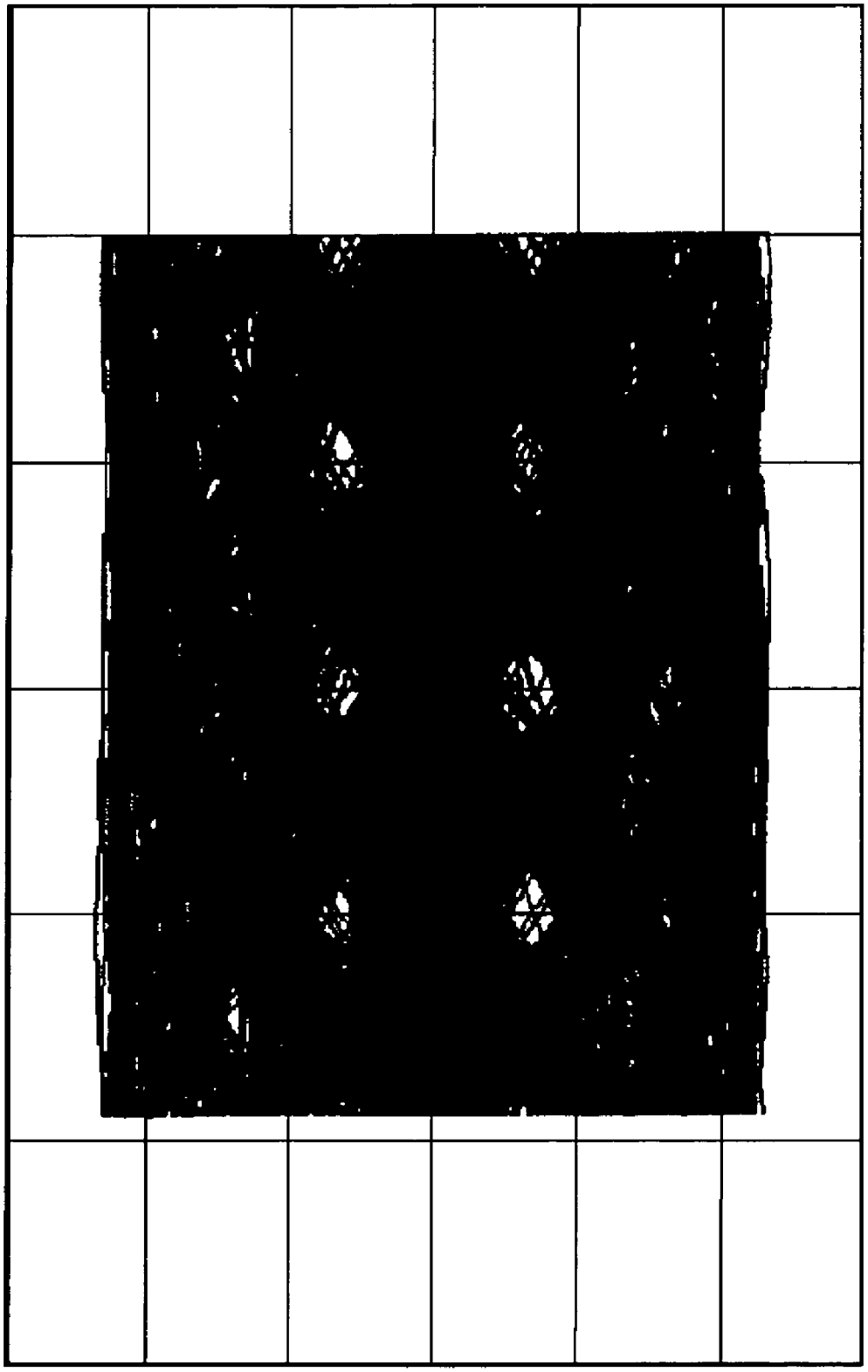
FIG. 21 is an eye diagram of the output of an ITP (NYQ-sinc) interpolation filter.
Figure 22:
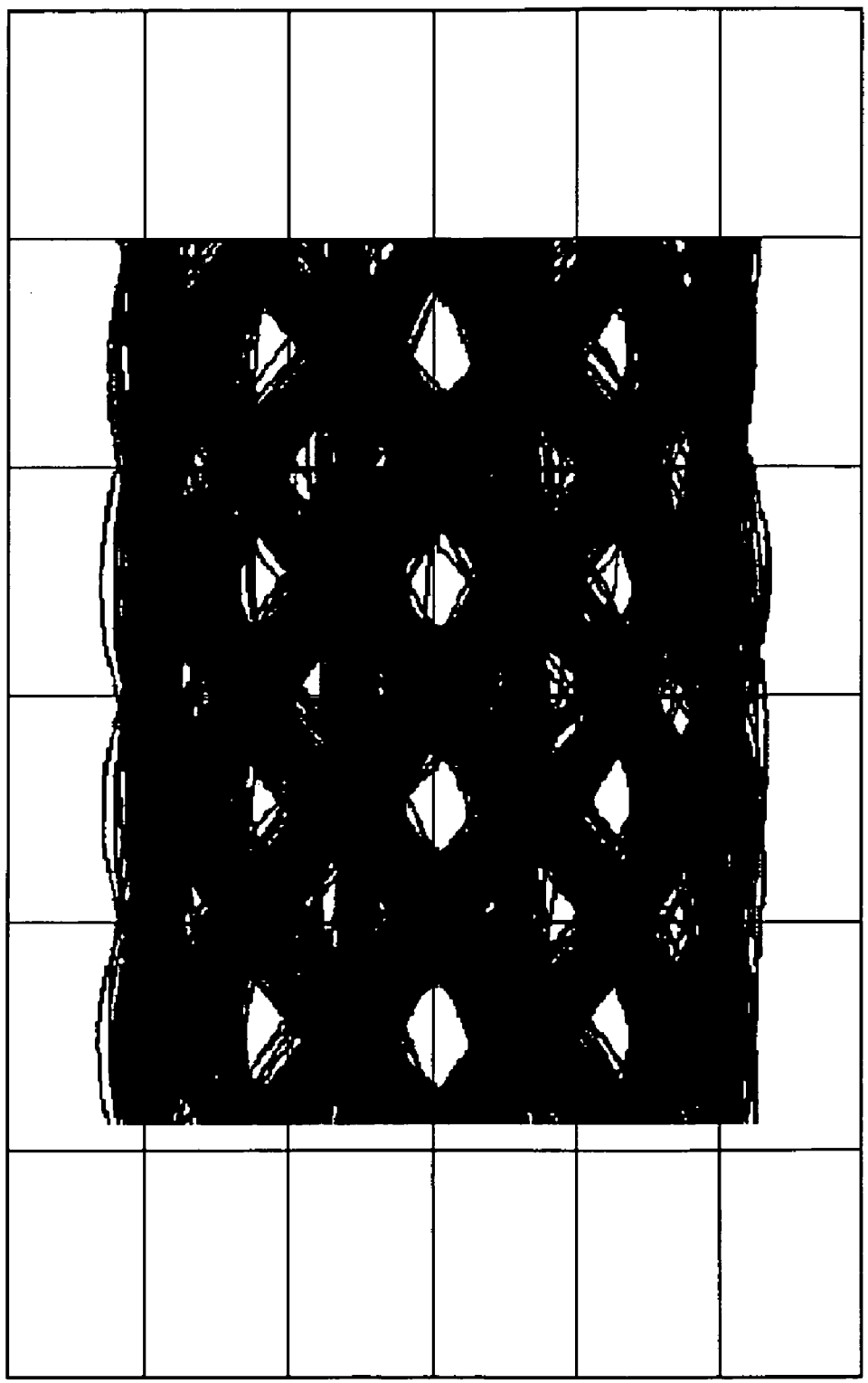
FIG. 22 is an eye diagram of the output of an ITP (MSE-PR) interpolation filter.

FIG. 21 shows an eye diagram of the output signal of the ITR digital PLL circuit using ITP (NYQ-sinc). FIG. 22 shows an eye diagram of the output signal y(k) of the ITR digital PLL circuit 10 using ITP (MSE-PR) according to the embodiment. Each eye diagram plots digital data (detection points) interpolated with the sinc function. In each eye diagram, the vertical axis shows the detection points.

In FIG. 21, ITP (NYQ-sinc) serving as the interpolation filter tap coefficients having frequency characteristics of the low-pass filter with a roll off of 0.2 is used. Therefore, there are no sufficiently wide eye openings. In contrast, in FIG. 22, ITP (MSE-PR) serving as the minimum MSE interpolation filter with respect to the PR1221 equalization target, which is determined with the procedure according to the embodiment of the present invention, is used. Therefore, there are wide eye openings.

Table 1 shows the SDNR and the variance of the output Δτ(k) of the phase error calculator, which is calculated using equation (1), in the cases of ITP (NYQ-sinc) and ITP (MSE-PR):

TABLE 1

|  | SDNR[dB] | Var(Δ τ (k)) |
|---|---|---|
| ITP(NYQ-SINC) | 2.49 | 0.00586 |
| ITP(MSE-PR) | 7.74 | 0.00341 |

The SDNR in the case of ITP (NYQ-sinc) of the related art is 2.49 dB, and the SDNR in the case of ITP (MSE-PR) according to the embodiment of the present invention is 7.74 dB, which clearly shows a marked improvement. The variance of the output of the phase error calculator (var(Δτ(k))) in the case of ITP (NYQ-sinc) of the related art is 0.00586, and the variance in the case of ITP (MSE-PR) according to the embodiment of the present invention is 0.00341, which clearly shows a marked improvement.

The following discusses an advantage of the case in which the estimated tap coefficients obtained by the minimum MSE filter estimator 31 are resampled, which is a feature of the embodiment of the present invention, and, on the basis of the resampling results, interpolation filter tap coefficients are determined.

Figure 23:
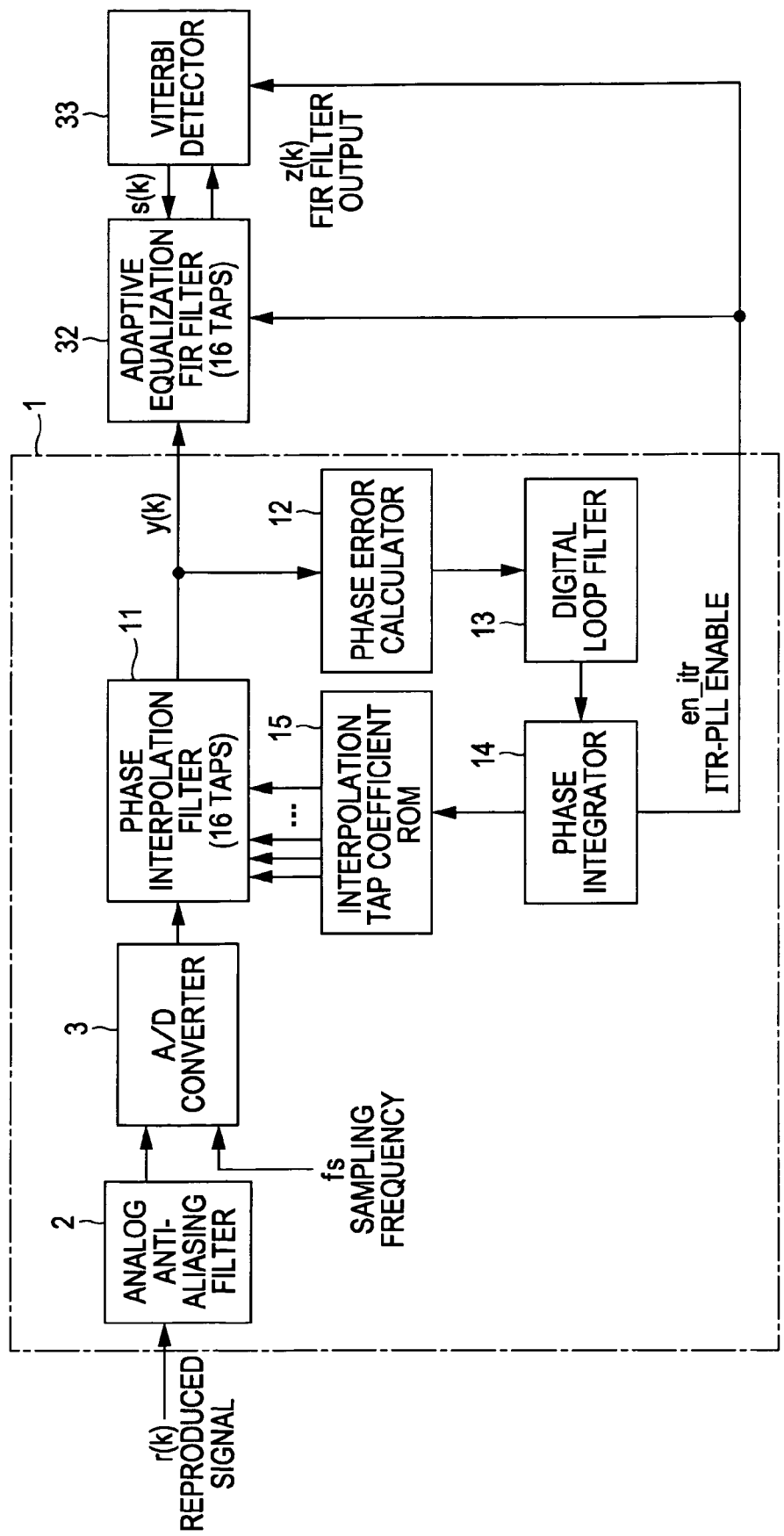
FIG. 23 is a block diagram of a simulator for evaluating an equalization error.

FIG. 23 shows a simulation block for discussing the case.

Referring to FIG. 23, basically, after the PLL output of the optical disk reproduced signal processor 1 shown in FIG. 1, the 16-tap adaptive equalization FIR filter 32 using the LMS algorithm is mounted, and the output z(k) of the adaptive equalization FIR filter 32 is input to the PR1221 Viterbi detector 33. The binary output s(k) of the Viterbi detector 33 is returned as a feedback to the adaptive equalization FIR filter 32 at a previous stage, thereby automatically generating the minimum MSE filter. The resampled ITP (MSE-PR) using the phase interpolation filter 11 in the ITR digital PLL circuit 10 and, for comparison, the not-resampled ITP (MSE-PR) are used, and equalization errors with respect to PR1221 in both cases are examined.

Specifically, a comparison is made between ITP (MSE-PR-RS0708), namely, interpolation filter tap coefficients obtained with the frequency sampling technique using the resampled minimum MSE tap coefficients B[i]: i=0, 1, 2, . . . , 15 shown in FIG. 17, and ITP (MSE-PR-RS0808), namely, interpolation filter tap coefficients obtained with the frequency sampling technique using the not-resampled minimum MSE tap coefficients B[i]: i=0, 1, 2, . . . , 15.

Figure 24:
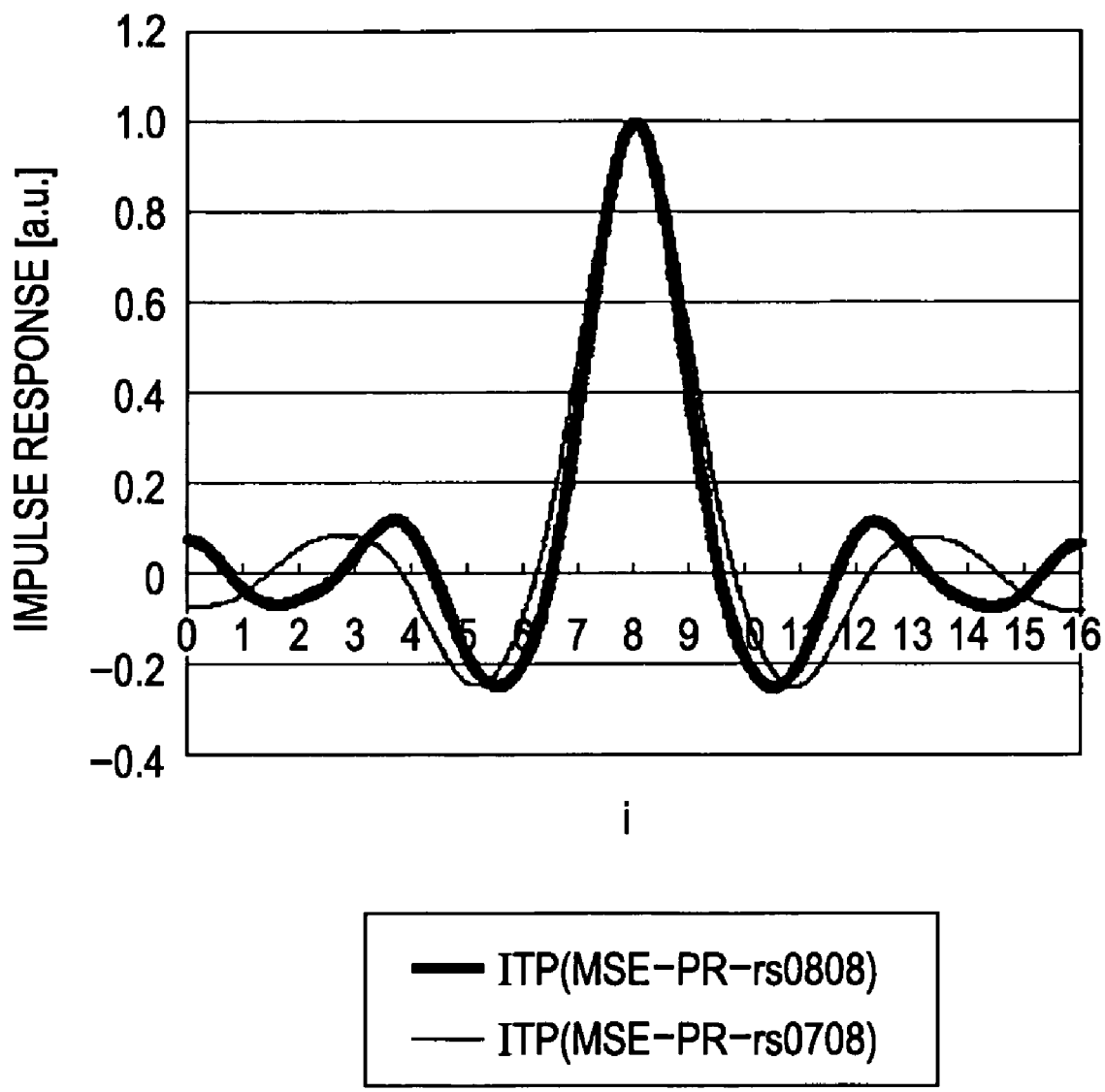
FIG. 24 is a graph showing tap coefficients of ITP (MSE-PR-RS0708) and ITP (MSE-PR-RS0808)

FIG. 24 shows the comparison between ITP (MSE-PR-RS0708) corresponding to FIG. 20 and ITP (MSE-PR-RS0808). The sampling period in resampling is changed to Ts=1/fs=(7/8)·Td, and the scale of the impulse response in the horizontal axis is thereby different.

Examples in which the data sequences of the impulse responses shown in FIG. 24 mapped to the phase interpolation filter tap coefficients (A[i][$n_{ph}$(k)]) are referred to as ITP (MSE-PR-RS0708) and ITP (MSE-PR-RS0808), respectively.

Table 2 shows the SDNR of the output of the ITR digital PLL and the SDNR of the output of the adaptive equalization FIR filter at a subsequent stage using ITP (MSE-PR-RS0708) and ITP (MSE-PR-RS0808) serving as interpolation tap coefficients:

TABLE 2

|  | SDNR [dB] | |
| --- | --- | --- |
|  | DIGITAL PLL OUTPUT | ADAPTIVE EQUALIZATION FILTER OUTPUT |
| ITP (MSE-PR-RS0708) | 7.74 | 8.11 |
| ITP (MSE-PR-RS0808) | 7.08 | 8.14 |

The comparison of the SDNR of the output of the ITR digital PLL shows that the SDNR using ITP (MSE-PR-RS0708) is 7.74 dB and the SDNR using ITP (MSE-PR-RS0808) is 7.08 dB, which clearly shows a marked performance improvement due to the resampling according to the embodiment of the present invention. The comparison of the SDNR of the output of the adaptive equalization FIR filter at a stage subsequent to the ITR digital PLL shows that the SDNR using ITP (MSE-PR-RS0708) is 8.11 dB and the SDNR using ITP (MSE-PR-RS0808) is 8.14 dB. There is no significant difference between the two cases. An equalization error of the resampled interpolation filter tap coefficients ITP (MSE-PR-RS0708) is about 8.11−7.74=0.37 dB, and an equalization error of the not-resampled interpolation filter tap coefficients ITP (MSE-PR-RS0808) is about 8.14−7.08=1.06 dB. In the ITR digital PLL, due to the resampling, which is a feature of the embodiment of the present invention, the interpolation filter taps of the ITR digital PLL have significantly satisfactory equalization performance.

The following discusses the effect of the resampling. That is, a DFT of the converged tap coefficients of the adaptive equalization FIR filter at a stage subsequent to the ITR digital PLL is taken to obtain the amplitude response in the frequency domain, which will be examined below.

The comparison is made with the amplitude characteristics in the frequency domain of the estimated tap coefficients obtained by the minimum MSE filter estimator 31, which is the basic data for determining the interpolation filter tap coefficients. Here, it is assumed that the amplitude characteristics are those of the interpolation filter taps.

Figure 25:
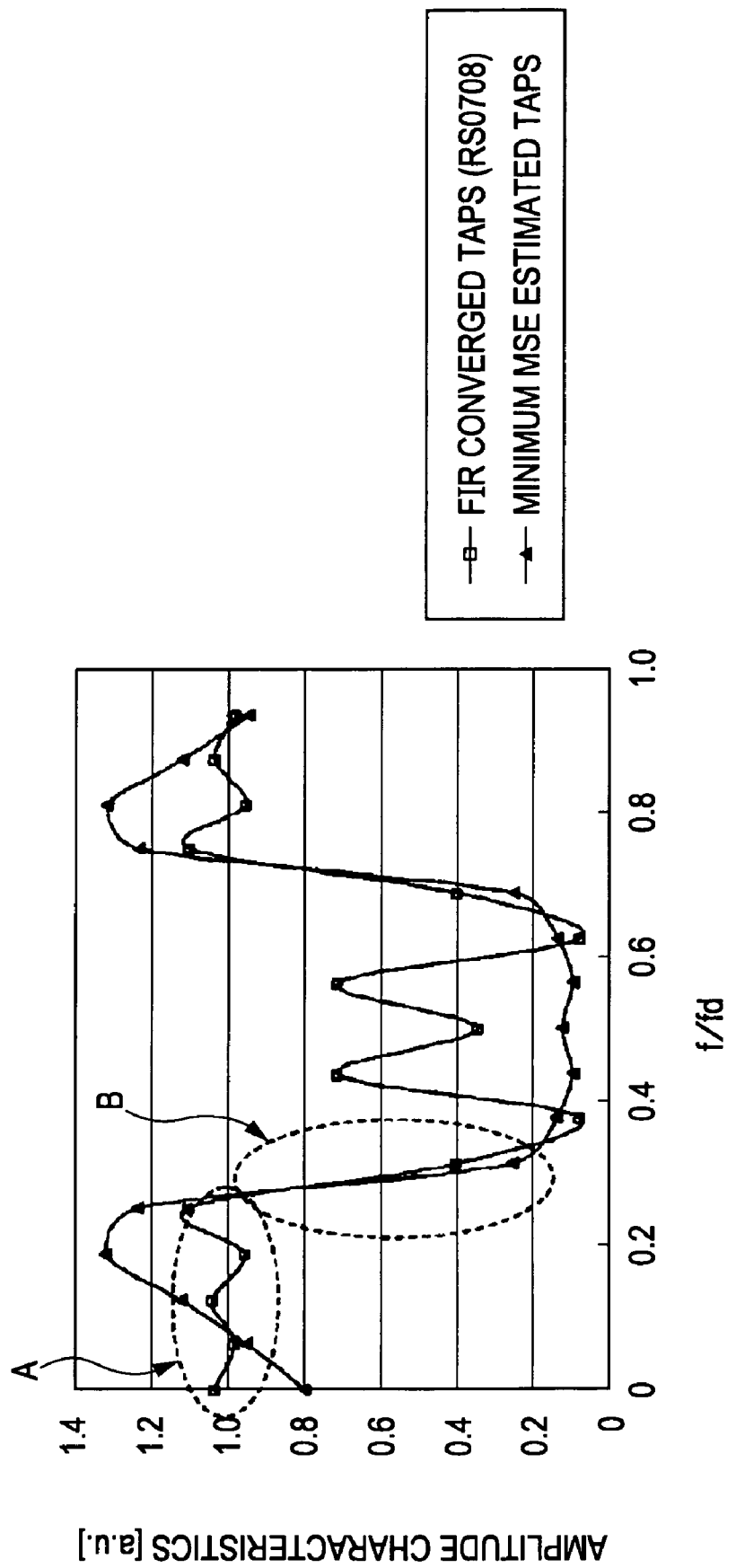
FIG. 25 is a graph showing amplitude characteristics of the ITP (MSE-PR-RS0708) tap coefficients and the minimum MSE converged filter tap coefficients.

FIG. 25 shows the amplitude characteristics of the resampled interpolation filter tap coefficients ITP (MSE-PR-RS0708) according to the embodiment of the present invention and the amplitude characteristics in the frequency domain of the estimated tap coefficients obtained by the minimum MSE filter estimator 31. For comparison, FIG. 26 shows the amplitude characteristics of the not-resampled interpolation filter tap coefficients ITP (MSE-PR-RS0808) and the amplitude characteristics in the frequency domain of the estimated tap coefficients obtained by the minimum MSE filter estimator 31.

In portion A of FIG. 25 according to the embodiment of the present invention, the comparison between the amplitude characteristics of the resampled interpolation filter tap coefficients ITP (MSE-PR-RS0708) and the amplitude characteristics of the adaptive equalization FIR filter at a subsequent stage clearly shows that the amplitude characteristics of ITP (MSE-PR-RS0708) are substantially flat until near f/fd≦0.25 in which signal components are attenuated by d limitation of 1-7 pp code. In portion B of FIG. 25, it is clear that the resampled interpolation filter tap coefficients ITP (MSE-PR-RS0708) and the adaptive equalization FIR filter have substantially the same characteristics when 0.25≦f/fd≦0.50 in which the amplitude component of the minimum MSE filter estimator 31 is suddenly attenuated. These results show that, because the resampled interpolation filter tap coefficients ITP (MSE-PR-RS0708) have significantly satisfactory equalization characteristics, it is not necessary that the adaptive equalization FIR filter at a subsequent stage provide further equalization.

Figure 26:
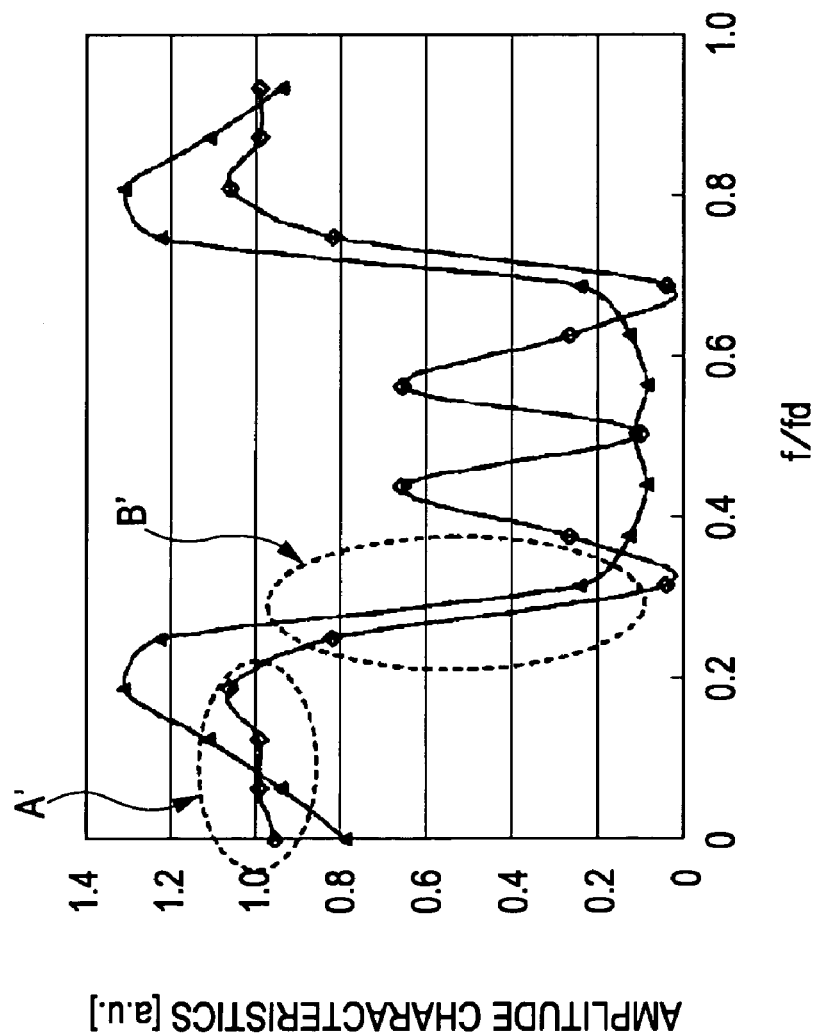
FIG. 26 is a graph showing amplitude characteristics of the ITP (MSE-PR-RS0808) tap coefficients and the minimum MSE converged filter tap coefficients.
Figure 27:
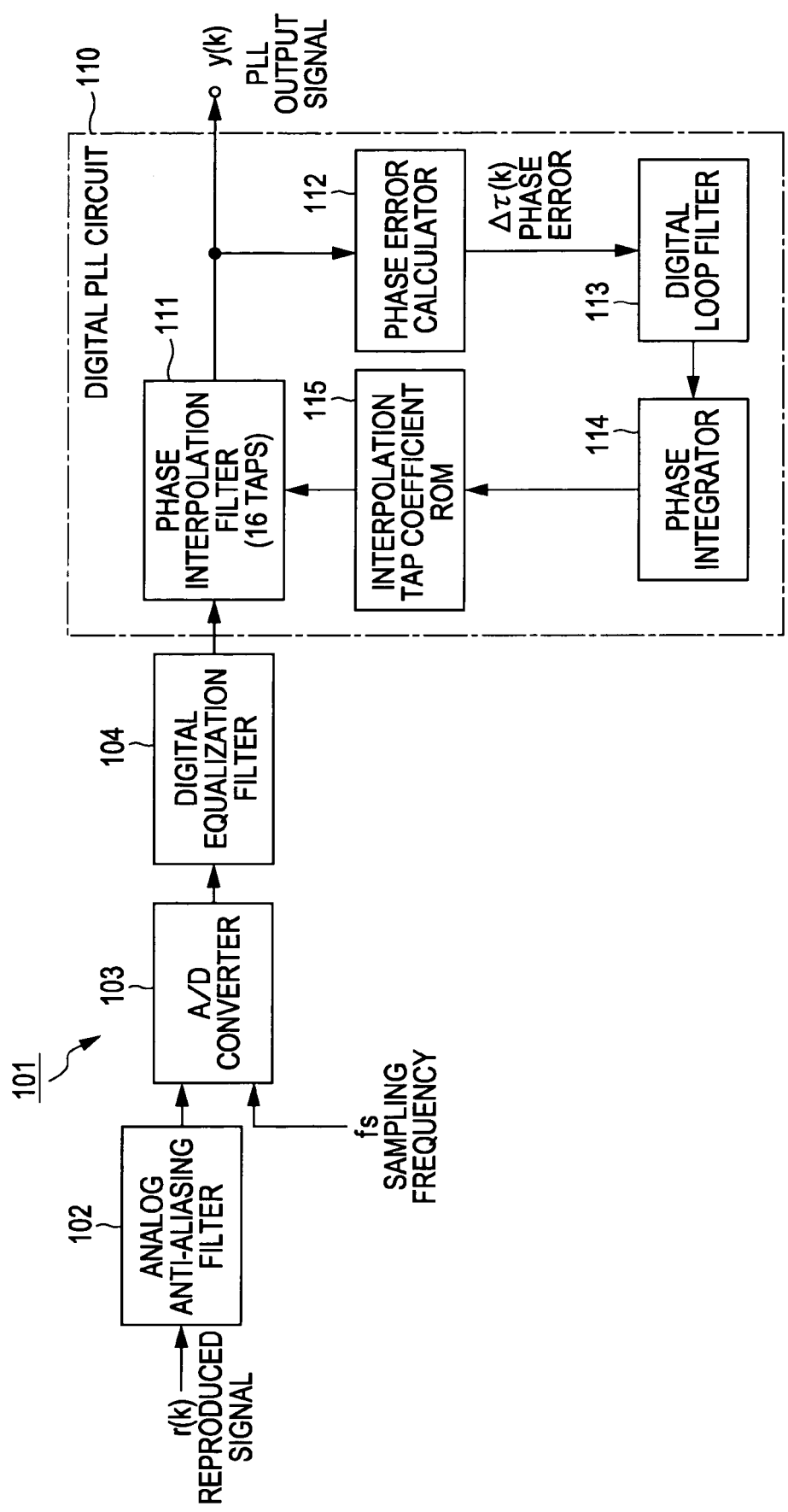
FIG. 27 is a block diagram of a general ITR digital PLL circuit for generating an optical disk reproduced signal.
Figure 28:
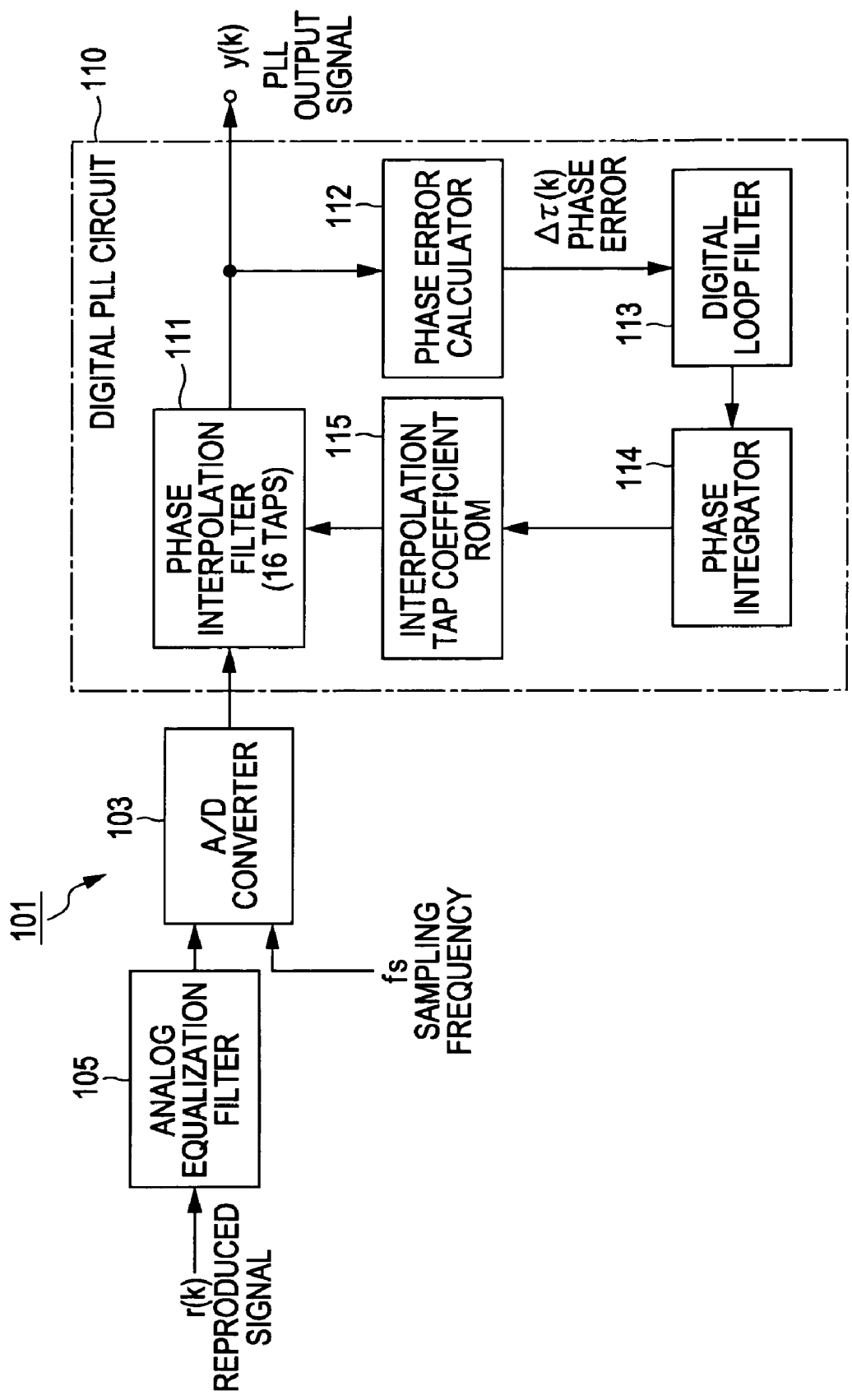
FIG. 28 is a block diagram of a circuit excluding, from the circuit shown in FIG. 27, a digital equalization filter provided at a stage prior to the PLL circuit.

For comparison, in portion A' of FIG. 26, the comparison between the amplitude characteristics of the not-resampled interpolation filter tap coefficients ITP (MSE-PR-RS0808) and the amplitude characteristics of the adaptive equalization FIR filter at a subsequent stage clearly shows that the amplitude characteristics of ITP (MSE-PR-RS00808) are substantially flat until near f/fd≦0.25 in which signal components are attenuated by d limitation of 1-7 pp code. However, in portion B' of FIG. 26, compared with portion B of FIG. 25, there is a large equalization error with respect to the amplitude characteristics of the adaptive equalization FIR filter at a subsequent stage when 0.25≦f/fd≦0.50 in which the amplitude component of the minimum MSE filter estimator 31 is suddenly attenuated. Because the resampling, which is a feature of the embodiment of the present invention, has not been performed, errors in the frequency domain occur in the interpolation filter tap coefficients generated on the basis of the filter characteristics estimated by the minimum MSE filter estimator 31. These results show that the resampling, which is a feature of the embodiment of the present invention, is a technique for further improving the performance of the phase interpolation filter in the ITR digital PLL.

Therefore, the method of determining the phase interpolation filter in the ITR digital PLL, which has been described in the embodiment of the present invention, has better equalization characteristics than those of the known method of determining the interpolation filter tap coefficients using ITP (NYQ-sinc) and the sinc function.

It should be understood by those skilled in the art that various modifications, combinations, sub-combinations, and alterations may occur depending on design requirements and other factors insofar as they are within the scope of the appended claims or the equivalents thereof.

What is claimed is:

1. A method for determining tap coefficients of a phase interpolation finite impulse response filter with respect to a digital-signal phase-locked loop processing apparatus including an analog-to-digital converter configured to receive a reproduced signal serving as digital data and to sample the received reproduced signal at a frequency higher than a data rate frequency and a phase-locked loop portion configured to perform phase locking of the reproduced signal by filtering the sampled reproduced signal obtained by the analog-to-digital converter using the phase interpolation finite impulse response filter and to output a data sequence of the phase-locked reproduced signal, the method comprising the step of:

providing an adaptive equalization finite impulse response filter operating at the data rate frequency at a stage subsequent to the phase-locked loop portion and determining the tap coefficients of the phase interpolation finite impulse response filter using, as estimated values, finite impulse response filter tap coefficients of the adaptive equalization finite impulse response filter, which are converged so as to achieve a minimum mean square error.

2. The method according to claim 1, further comprising the steps of:

interpolating the finite impulse response filter tap coefficients of the adaptive equalization finite impulse response filter operating at the data rate frequency, which are converged so as to achieve the minimum mean square error, and resampling the finite impulse response filter tap coefficients with an interval in a time domain corresponding to a sampling frequency;

orthogonally converting the resampled finite impulse response filter tap coefficients into a frequency domain to obtain filter frequency characteristics corresponding to the sampling frequency;

oversampling the filter frequency characteristics corresponding to the sampling frequency in the frequency domain;

inverse-orthogonally converting the oversampled filter frequency characteristics to obtain finite impulse response filter tap coefficients in the time domain; and determining the tap coefficients of the phase interpolation finite impulse response filter using the obtained finite impulse response filter tap coefficients as estimated values.

3. The method according to claim 2, wherein an arbitrary partial response equalization target is used as a target value for converging the finite impulse response filter tap coefficients of the adaptive equalization finite impulse response filter operating at the data rate frequency so as to achieve the minimum mean square error.

4. A device for determining tap coefficients of a phase interpolation finite impulse response filter with respect to a digital-signal phase-locked loop processing apparatus including an analog-to-digital converter configured to receive a reproduced signal serving as digital data and to sample the received reproduced signal at a frequency higher than a data rate frequency and a phase-locked loop portion configured to perform phase locking of the reproduced signal by filtering the sampled reproduced signal obtained by the analog-to-digital converter using the phase interpolation finite impulse response filter and to output a data sequence of the phase-locked reproduced signal, the device comprising:

an adaptive equalization finite impulse response filter operating at the data rate frequency configured to be provided at a stage subsequent to the phase-locked loop portion; and a calculator configured to determine the tap coefficients of the phase interpolation finite impulse response filter using, as estimated values, finite impulse response filter tap coefficients of the adaptive equalization finite impulse response filter, which are converged so as to achieve a minimum mean square error.

5. The device according to claim 4, wherein the calculator interpolates the finite impulse response filter tap coefficients of the adaptive equalization finite impulse response filter operating at the data rate frequency, which are converged so as to achieve the minimum mean square error, and resamples the finite impulse response filter tap coefficients with an interval in a time domain corresponding to a sampling frequency, the calculator orthogonally converts the resampled finite impulse response filter tap coefficients into a frequency domain to obtain filter frequency characteristics corresponding to the sampling frequency, the calculator oversamples the filter frequency characteristics corresponding to the sampling frequency in the frequency domain, the calculator inverse-orthogonally converts the oversampled filter frequency characteristics to obtain finite impulse response filter tap coefficients in the time domain, and the calculator determines the tap coefficients of the phase interpolation finite impulse response filter using the obtained finite impulse response filter tap coefficients as estimated values.

6. The device according to claim 5, wherein the calculator uses an arbitrary partial response equalization target as a target value for converging the finite impulse response filter tap coefficients of the adaptive equalization finite impulse response filter operating at the data rate frequency so as to achieve the minimum mean square error.

* * * * *